US011918038B2

(12) United States Patent
Emmett et al.

(10) Patent No.: US 11,918,038 B2
(45) Date of Patent: Mar. 5, 2024

(54) SHISHA DEVICE WITH ACTIVE COOLING FOR ENHANCED AEROSOL CHARACTERISTICS

(71) Applicant: PHILIP MORRIS PRODUCTS S.A., Neuchâtel (CH)

(72) Inventors: Robert Emmett, Neuchâtel (CH); Jean-Pierre Schaller, Genèva (CH); Ana Isabel Gonzalez Florez, St-Sulpice (CH); Jakub Bialek, Echandens (CH)

(73) Assignee: Philip Morris Products S.A., Neuchâtel (CH)

( * ) Notice: Subject to any disclaimer, the term of this patent is extended or adjusted under 35 U.S.C. 154(b) by 897 days.

(21) Appl. No.: 16/960,734

(22) PCT Filed: Jan. 9, 2019

(86) PCT No.: PCT/IB2019/050139
§ 371 (c)(1),
(2) Date: Jul. 8, 2020

(87) PCT Pub. No.: WO2019/138325
PCT Pub. Date: Jul. 18, 2019

(65) Prior Publication Data

US 2020/0337369 A1 Oct. 29, 2020

(30) Foreign Application Priority Data

Jan. 15, 2018 (EP) .................................... 18151678

(51) Int. Cl.
*A24F 1/30* (2006.01)
*A24F 1/32* (2006.01)
(Continued)

(52) U.S. Cl.
CPC ................. *A24F 1/30* (2013.01); *A24F 1/32* (2013.01); *A24F 40/485* (2020.01);
(Continued)

(58) Field of Classification Search
CPC ........................................................ A24F 1/30
See application file for complete search history.

(56) References Cited

U.S. PATENT DOCUMENTS 3,882,875 A 5/1975 Frost
8,434,494 B1 5/2013 Gonzalez
(Continued)

FOREIGN PATENT DOCUMENTS

CN 102 018 287 A 4/2011
CN 202050898 U 11/2011
(Continued)

OTHER PUBLICATIONS

Russian Decision to Grant and Search Report for RU application No. 2020126573 issued by the Patent Office of the Russian Federation dated May 24, 2022; 22 pgs. including English translation.
(Continued)

*Primary Examiner* — Philip Y Louie
*Assistant Examiner* — Miles A Simpson
(74) *Attorney, Agent, or Firm* — Mueting Raasch Group

(57) ABSTRACT

A shisha device comprises a cooling element (13) disposed along an airflow channel to cool an aerosol. The cooling element unit utilizes active cooling and may additionally utilize passive cooling. The cooling element may comprise a conduit (21) comprising a thermally conductive material. The cooling element may be integrally formed with an accelerating element (14) disposed along the airflow channel. Cooling may occur before or during acceleration of the aerosol by the accelerating element. The cooling may contribute to the condensation in the aerosol.

15 Claims, 10 Drawing Sheets

(51) Int. Cl.

| | |
|---|---|
| ***A24F 40/485*** | (2020.01) |
| ***B05B 7/16*** | (2006.01) |
| ***F25B 21/02*** | (2006.01) |

(52) U.S. Cl.

CPC ............ *B05B 7/1666* (2013.01); *B05B 7/168* (2013.01); *F25B 21/02* (2013.01); *F25B 2321/023* (2013.01)

(56) References Cited

U.S. PATENT DOCUMENTS

| | | | | |
|---|---|---|---|---|
| 2008/0029107 | A1 | 2/2008 | Ruff et al. | |
| 2014/0130812 | A1 | 5/2014 | Kling et al. | |
| 2014/0251355 | A1 | 9/2014 | Tracey | |
| 2016/0044960 | A1 | 2/2016 | O'Connor | |
| 2016/0295911 | A1 | 10/2016 | Kalousek et al. | |
| 2016/0302481 | A1 | 10/2016 | Al Arja et al. | |
| 2017/0055588 | A1* | 3/2017 | Cameron .............. | A61M 15/06 |
| 2018/0029107 | A1 | 2/2018 | Bewlay et al. | |
| 2019/0313692 | A1* | 10/2019 | Jones .................... | A24F 40/485 |

FOREIGN PATENT DOCUMENTS

| | | | |
|---|---|---|---|
| CN | 103230098 | A | 8/2013 |
| CN | 204560945 | U | 8/2015 |
| RU | 124870 | | 2/2013 |
| RU | 140206 | | 5/2014 |
| WO | 2014/102092 | A1 | 7/2014 |
| WO | 2015/177255 | A1 | 11/2015 |
| WO | 2017/178931 | A1 | 10/2017 |

OTHER PUBLICATIONS

International Search Report and Written Opinion for PCT/IB2019/050139, issued by the European Patent Office dated Apr. 23, 2019; 11 pgs.

International Preliminary Report on Patentability for PCT/IB2019/050139, issued by the European Patent Office dated May 7, 2020; 10 pgs.

Extended European Search Report for EP 18151678.2, issued by the European patent Office dated Jul. 10, 2018; 8 pgs.

Chinese Office Action for Chinese Application No. 201980006801.X issued by the Chinese Patent Office dated Feb. 9, 2023; 17 pgs. Including English Translation.

* cited by examiner

SHISHA DEVICE WITH ACTIVE COOLING FOR ENHANCED AEROSOL CHARACTERISTICS

This application is the § 371 U.S. National Stage of International Application No. PCT/IB2019/050139, filed 9 Jan. 2019, which claims the benefit of European Application No. 18151678.2, filed 15 Jan. 2018.

The present disclosure relates to shisha devices and, more particularly, to shisha devices that heat an aerosol-forming substrate without combusting the substrate and that enhance characteristics of generated aerosol.

Conventional shisha devices are used to smoke tobacco and are configured such that vapor and smoke pass through a water basin before inhalation by a consumer. Shisha devices may include one outlet or more than one outlet so that the device can be used by more than one consumer at a time. Use of shisha devices is considered by many to be a leisure activity and a social experience.

The tobacco used in conventional shisha devices may be mixed with other ingredients, for example, to increase the volume of the vapour and smoke produced, to alter flavour, or both. Charcoal pellets are typically used to heat the tobacco in a conventional shisha device, which may cause full or partial combustion of the tobacco or other ingredients.

Some shisha devices have been proposed that use electrical heat sources to heat or combust the tobacco to, for example, avoid by-products of burning charcoal or to improve the consistency with which the tobacco is heated or combusted. However, substituting an electric heater for charcoal may result in unsatisfactory production of aerosol in terms of visible smoke or aerosol, total aerosol mass, or visible smoke or aerosol and aerosol mass.

It would be desirable to provide a shisha device that produces a satisfactory amount of one or both of visible aerosol and total aerosol mass with a sufficiently low resistance to draw. It would also be desirable to provide a shisha device that heats a substrate in a manner that does not result in combustion by-products.

Various aspects of the disclosure relate to a shisha device comprising a cooling element disposed along an airflow channel. The cooling element may utilize passive cooling, active cooling, or both. The cooling element may comprise a conduit comprising a thermally conductive material. The cooling may enhance condensation of the aerosol, to increase visible aerosol, total aerosol mass (TAM), or visible aerosol and TAM. The cooling element may be integrally formed with an accelerating element, such as a nozzle, disposed along the airflow channel. The combination of cooling and accelerating the aerosol may result in substantial increases in visible aerosol, TAM, or visible aerosol and TAM. In addition, the combination of cooling with accelerating allows for the use of nozzles or other suitable accelerating elements having inner diameters that are sufficiently large to avoid high resistance to draw (RTD). Accelerating the aerosol may result in a pressure drop and spraying-seeding effect, which may be explained by the Venturi effect or the Bernoulli effect and may increase TAM.

In one aspect of the invention, a shisha device comprises a vessel defining an interior for housing a volume of liquid. The vessel comprises a head space outlet. The shisha device also comprises an aerosol-generating element for receiving an aerosol-forming substrate. The aerosol-generating element is in fluid communication with the interior of the vessel via an airflow channel. The airflow channel extends into the interior of the vessel from the aerosol-generating element. The shisha device further comprises a cooling element along the airflow channel between the aerosol-generating element and the vessel. The cooling element is configured to cool aerosol in the airflow channel that flows through the cooling element and is configured to provide active cooling to transfer heat away from the airflow channel, such as to outside the vessel. The shisha device comprises an accelerating element along the airflow channel between the aerosol-generating element and the vessel. The accelerating element is configured to accelerate aerosol in the airflow channel that flows through the accelerating element.

In one or more embodiments, the shisha device further comprises a chamber along the airflow channel accelerating element and the vessel. The chamber is configured to receive aerosol after the aerosol has been cooled and accelerated.

In one or more embodiments, at least a portion of the cooling element and the accelerating element integrally form a nozzle.

In one or more embodiments, the shisha device defines a resistance to draw along the airflow channel of 45 millimetres water gauge (mmWG) or less.

In one or more embodiments, the cooling element is at least partially or entirely disposed between the chamber and the aerosol-generating element.

In one or more embodiments, the cooling element is further configured to provide passive cooling. For example, the cooling element may comprise one or both of a conduit comprising a thermally conductive material and a heatsink.

In one or more embodiments, the cooling element comprises at least one of: a heat pump, a fan, a cooling receptacle having an interior volume for liquid disposed adjacent to the airflow channel, a water block, and a liquid pump. It will be appreciated that the cooling element may comprise any one of a variety of combinations thereof.

In one or more embodiments, the conduit and the accelerating element comprises one or more materials having thermal diffusivities of $10^{-6}$ $m^2/s$ or greater In one or more embodiments, the conduit and the accelerating element comprises one or more materials having thermal diffusivities of $10^{-5}$ $m^2/s$ or greater.

In one or more embodiments, the cooling receptacle is configured to evaporate liquid disposed in the interior volume and transfer the evaporated liquid to the outside of the vessel.

In one or more embodiments, the cooling element comprises: the cooling receptacle; and at least one of the heatsink and the water block, in fluid communication with the interior volume of the cooling receptacle.

In one or more embodiments, the cooling element is configured to preheat air that flows into the aerosol-generating element.

In one or more embodiments, the chamber comprises a main chamber in fluid communication with the accelerating element. The main chamber may be sized or shaped or both sized and shaped to allow deceleration of the aerosol in the main chamber when the aerosol exits the accelerating element and enters the main chamber.

In one or more embodiments, the chamber comprises a main chamber in fluid communication with the accelerating element. The main chamber may be sized or shaped or both sized and shaped to allow a reduction in pressure of the aerosol in the main chamber when the aerosol exits the accelerating element and enters the main chamber.

In one or more embodiments, the accelerating element comprises a first aperture proximal to the aerosol-generating element and a second aperture in a main chamber. Aerosol flows into the accelerating element through the first aperture and out of the second aperture into the main chamber. Optionally, the first aperture has a diameter larger than the second aperture.

In one or more embodiments, the cooling element and the accelerating element are arranged such that aerosol flowing through the cooling element and the accelerating element results in an increase in total aerosol mass that exits a head space outlet of the vessel of the shisha device during use of the shisha device relative to a total aerosol mass that exits a head space outlet of a vessel of a shisha device that does not comprise the cooling element and the accelerating element.

In one or more embodiments, the increase in total aerosol mass is 1.5-fold or greater relative to a shisha device that does not include the cooling element and the accelerating element.

In one or more embodiments, the aerosol-generating element is configured to heat an aerosol-forming substrate to cause aerosol formation without combusting the aerosol-forming substrate.

Advantageously, one or more shisha devices described herein may provide a low resistance to draw (RTD) while still achieving sufficient production of aerosol by controlling the temperature inside the cooling element. The temperature inside the cooling element may be a temperature inside a cavity of the cooling element. The temperature inside the cooling element may be a temperature inside the airflow channel at a position at which the cooling element is disposed. In general, cooling down the cavity of the cooling element or the airflow channel may allow a higher production of aerosol compared to using a device which does not incorporate such aerosol cooling, whether or not an accelerating element or expansion chamber is also used. When an accelerating element is used, cooling down the cavity of the cooling element or the airflow channel may allow a cross-sectional diameter of the accelerating element, which may be a nozzle, to be a sufficient size to facilitate a desirable RTD while achieving a higher production of aerosol compared to using a device which does not incorporate such aerosol cooling. In general, a larger diameter results in a lower RTD. One or more shisha devices described herein may produce substantially more visible aerosol, deliver substantially more TAM, or produce substantially more visible aerosol and deliver substantially more TAM than similar devices that have a similar RTD but do not have a cooling element. In addition, instead of merely venting air used in the cooling of the aerosol, such air may be repurposed. For example, the air may function as preheated air, which is air heated prior to entering the aerosol-generating element. This may provide more homogeneous heating of the substrate, power savings during use, and less complex manufacturing. Further, a user of the device may have an experience more typical of an experience associated with a conventional shisha device (in which an aerosol-forming substrate is heated with a burning, or combusting, piece of charcoal), particularly in terms of aerosol production and RTD, but without combustion and therefore without combustion by-products of the charcoal. Still further, if the shisha device is configured to sufficiently heat an aerosol-forming substrate to produce an aerosol without burning the aerosol-forming substrate, combustion by-products of the aerosol-forming substrate may also be avoided. Other advantages and benefits will become apparent to one skilled in the art having the benefit of this disclosure.

All scientific and technical terms used herein have meanings commonly used in the art unless otherwise specified. The definitions provided herein are to facilitate understanding of certain terms used frequently herein.

The term "aerosol-forming substrate" refers to a device or substrate that releases, upon heating, volatile compounds that may form an aerosol to be inhaled by a user. Suitable aerosol-forming substrates may include plant-based material. For example, the aerosol-forming substrate may include tobacco or a tobacco-containing material containing volatile tobacco flavour compounds, which are released from the aerosol-forming substrate upon heating. In addition, or alternatively, an aerosol-forming substrate may include a non-tobacco containing material. The aerosol-forming substrate may include homogenized plant-based material. The aerosol-forming substrate may include at least one aerosol former. The aerosol-forming substrate may include other additives and ingredients such as flavourants. In some embodiments, the aerosol-forming substrate comprises a liquid at room temperature. For example, the aerosol-forming substrate may comprise a liquid solution, suspension, dispersion or the like. In some embodiments, the aerosol-forming substrate comprises a solid at room temperature. For example, the aerosol-forming substrate may comprise tobacco or sugar. Preferably, the aerosol-forming substrate comprises nicotine.

The term "tobacco material" refers to a material or substance comprising tobacco, which comprises tobacco blends or flavoured tobacco, for example.

As used herein, the term "aerosol" as used when discussing a flow of aerosol, may refer to aerosol, air containing aerosol or vapour, or aerosol-entrained air. Air containing vapour may be a precursor to air containing aerosol, for example, after being cooled or after being accelerated.

As used herein, the term "cooling" refers to a reduction of internal energy in a system, which may be achieved by heat transfer but also by work done by the system.

Having defined certain frequently-used terms above, the shisha device of the present disclosure will be described herein in more detail. In general, a shisha device comprises a cooling element disposed along an airflow channel. The cooling element may contribute to providing enhanced aerosol characteristics, such as more TAM whether or not an accelerating element or expansion chamber is used. In particular, the cooling element may reduce temperature of aerosol-entrained air to substantially improve the nucleation process. In some embodiments, the temperature measured inside the cavity of a nozzle may be reduced down to about 10° C. using the cooling element as compared to, for example, 40° C., when no cooling is applied.

During use, the airflow channel may be in fluid communication with the head space outlet through some liquid. The airflow channel may start proximate, or adjacent, to an aerosol-forming substrate. The airflow channel may end in an interior of a vessel. In particular, the end of the airflow channel may extend into a volume of liquid in the interior of the vessel during use of the shisha device. However, the airflow channel does not necessarily need to end in the interior of the vessel.

The cooling element may be used in combination with an air accelerating element. The air accelerating element may be integrally formed with at least one of the cooling element or a chamber. The chamber may be a deceleration chamber for aerosol. In some embodiments, the cooling element is configured to cool aerosol before or during acceleration by the accelerating element.

The shisha device may comprise an aerosol-generating element. The aerosol-generating element may be used with an aerosol-forming substrate to produce aerosol. In particular, the aerosol-generating element may heat the aerosol-forming substrate to generate aerosol. The aerosol-forming substrate may be heated, but not burned, by the aerosol-generating element. The aerosol-generating element may comprise a heating element. The heating element may comprise an electric heater.

A shisha device may comprise a vessel. The vessel may define an interior. The vessel may be configured to contain liquid. In particular, the interior of the vessel may contain a volume of liquid.

Air may be flowed through the aerosol-generating element to draw aerosol from the aerosol-generating element through the airflow channel. The source of the airflow may be suction or puffing of a user. In response, aerosol may be drawn through liquid contained in the interior of the vessel. The aerosol, which may be altered by being pulled through the liquid, may exit the shisha device through a head space outlet of the vessel. The user may suction a mouthpiece in fluid communication with the head space outlet.

The aerosol-generating element is in fluid communication with the interior of the vessel. In particular, the airflow channel may at least partially define the fluid communication from the aerosol-generating element to the interior of the vessel. Various components may be disposed along the airflow channel that may enhance characteristics of aerosol flowing through the head space outlet to the user.

The term "downstream" refers to a direction along the airflow channel toward the interior of the vessel from the aerosol-generating element. The term "upstream" refers to a direction opposite to the downstream direction, or a direction along the airflow channel toward the aerosol-generating element from the interior of the vessel.

The shisha device comprises a cooling element. The cooling element may be disposed along the airflow channel. The cooling element may integrally form part of the airflow channel. The cooling element is configured to cool aerosol in the airflow channel, particularly air that flows through the cooling element. The cooling element may be disposed downstream from the aerosol-generating element along the airflow channel. In particular, the cooling element may be disposed between the aerosol-generating element and the end of the airflow channel, or at least between the aerosol-generating element and the vessel. The cooling element may be at least partially or entirely disposed upstream from the chamber.

The shisha device may comprise an accelerating element. The accelerating element may be disposed along the airflow channel. The accelerating element may integrally form part of the airflow channel. The accelerating element may be configured to accelerate aerosol in the airflow channel, particularly air that flows through the accelerating element. The accelerating element may be disposed downstream from the aerosol-generating element along the airflow channel. The accelerating element may be disposed between the aerosol-generating element and the vessel. The accelerating element may also be disposed downstream of the cooling element. The accelerating element may be disposed between the cooling element and the vessel. Cooled aerosol may be received by the accelerating element.

The accelerating element may be of any suitable shape to provide acceleration of aerosol, such as a nozzle shape. The nozzle may be tapered to facilitate acceleration of the aerosol, or aerosol-entrained air, through a small diameter aperture. The accelerating element may be formed of any suitable material capable of being shaped to provide acceleration, such as an epoxy resin or aluminium. The epoxy resin may be a high temperature epoxy resin.

The cooling element and the accelerating element may be an integral or unitary piece. However, the cooling element and the accelerating element may also be separate pieces. The cooling element may operably couple to the accelerating element to allow air in the airflow channel to flow through both elements. The cooling element and the accelerating element may together form a conduit. The conduit may be described as a nozzle.

A chamber may be disposed along the airflow channel. The chamber may be configured to decelerate air. Aerosol may be formed in response to decelerating aerosol-entrained air. The chamber may be disposed downstream from the aerosol-generating element. In particular, the chamber may be disposed between the aerosol-generating element and the vessel, or more particularly, between the accelerating element and the vessel.

The chamber may be disposed downstream from the cooling element. The chamber may also be disposed downstream from the accelerating element. The accelerating element may be at least partially or entirely disposed in the chamber. In some embodiments, the accelerating element forms an inlet of the chamber. The accelerating element may be integrally formed with the chamber. The cooling element may be at least partially or entirely disposed upstream from the chamber. In some embodiments, the cooling element may be integrally formed with the accelerating element to form a nozzle, which may extend at least partially into the chamber.

One or more components of the shisha device forming the airflow channel may have a resistance to draw (RTD). The RTD may be related to how easily the user may draw aerosol through the airflow channel of the shisha device. The RTD of the accelerating element may at least partially contribute to the RTD of the airflow channel. The accelerating element may define a more restrictive cross-sectional diameter through the airflow channel, for example, compared to the chamber and the cooling element. The accelerating element may define the RTD of the airflow channel. In particular, the RTD may be less than or equal to about 45 millimetres, water gauge (mmWG), preferably equal to about 38 millimetres water gauge or less.

In general, the cooling element may operate by being heated by the aerosol by convection and transferring the heat away from the air. The cooling element may make use of various passive or active techniques to accomplish cooling of the aerosol.

As used herein, the term "passive cooling" refers to cooling without additional power consumption or power source. The term "active cooling" refers to cooling using additional power consumption or power source. The cooling element may be operably coupled to the power source, such as a power supply or battery, to provide active cooling. The effectiveness of cooling, especially passive cooling, may be affected by certain conditions, such as ambient temperature, temperature gradient, heat transfer ability, humidity, and ventilation.

The cooling element comprises one or more active cooling elements and may additionally comprise one or more passive cooling elements.

Components of the cooling element may comprise at least one of: a conduit comprising a thermally conductive material, a heatsink, a heat pump, a fan, a cooling receptacle having an interior volume for liquid disposed outside of the airflow channel, a water block, and a liquid pump. Passive components may comprise at least one of the conduit, the heatsink, the cooling receptacle, and the water block. Active components may comprise the heat pump, the fan, and the liquid pump. Each component may be thermally coupled to the aerosol flowing through the cooling element. More than one of these components may be used together to further enhance cooling.

The conduit of the cooling element may comprise a material configured to facilitate passive cooling of aerosol flowing through a cavity of the conduit. The conduit may comprise a thermally conductive material, which may be used to draw heat away from the aerosol. The conduit may be heated by the aerosol. The thermal diffusivity of the material may be equal to or greater than about $10^{-6}$ $m^2/s$, $10^{-5}$ $m^2/S$, about $5\times10^{-5}$ $m^2/S$, or even about $10^{-4}$ $m^2/S$.

Non-limiting examples of thermally conductive material include aluminium, which has a thermal diffusivity of $9.7\times10^{-5}$ $m^2/s$, and copper.

In some embodiments, a portion of the conduit forms the accelerating element. For example, the conduit may be a nozzle comprising the cooling element and the accelerating element.

Air outside of the airflow channel flowing past the conduit may draw heat away from the conduit. This cooling airflow may be provided by the design of the shisha device. The shisha device may comprise a cooling airflow channel extending from an ambient air source (for example, the ambient environment) to the cooling element. In one example, the cooling element may heat air that rises upward and causes a flow of the ambient air through the cooling airflow channel and past the cooling element. Proper ventilation design of the shisha device may facilitate this airflow and may provide a passive fan. In another embodiment, the cooling airflow may be facilitated by the puffing of the user. The cooling airflow channel may be designed to extend to the mouthpiece. The puffing of the user may facilitate ambient air to flow through the cooling airflow channel and past the cooling element. The same puffing of the user to generate the cooling airflow may also draw the aerosol through the airflow channel, and vice versa.

The air heated by the cooling element may be used to provide preheated air to the aerosol-generating element, which may facilitate improved operation of the aerosol-generating element. For example, the ambient air may be in fluid communication with the cooling element through the cooling airflow channel. The cooling element may heat the ambient air when cooling the aerosol. The heated air may be in fluid communication with the aerosol-generating element. In particular, the heated air may be drawn through the aerosol-generating element to produce more aerosol, which may then be drawn into the airflow channel.

Typically, heaters increase the temperature of the substrate from the outside to the inside, which may take a long time and may produce a thermogradient through the substrate. By passing a mass of hot air along the substrate, the temperature of the substrate may be increased more quickly and may flatten the thermogradient.

Using thermally conductive material may not be limited to the cooling element. For example, the accelerating element may be formed of the thermally conductive material. In some embodiments, both the conduit and the accelerating element are formed of thermally conductive material. For example, conduit and the accelerating element may be integrally formed together.

In some embodiments, the conduit of the cooling element may be formed of a material that is not thermally conductive or has a low thermal conductivity. For example, the conduit may be formed of an epoxy resin. Other components of the cooling element may be used to provide the cooling effect.

Various types of heatsinks may be used. The heatsink may be formed of thermally conductive material. The heatsink may be a fringed heatsink. For example, the fringed heatsink may include a plurality of fins. One or more fins may have a surface area of at least 225 $mm^2$. The fins may be relatively thin. One or more of the fins may have a thickness of at most 0.5 mm. The cooling airflow outside of the airflow channel may draw heat away from the heatsink. The heatsink may be a heat pipe. The heat pipe may include a working fluid that may be subjected to vaporization and then condensation.

The heatsink may be used in combination with the conduit. In particular, the heatsink may be thermally coupled to the aerosol through the conduit. The heatsink may be disposed outside of the conduit. For example, the heatsink may at least partially or entirely surround a portion of the conduit. The heatsink may draw heat away from the conduit.

Any suitable heat pump may be used. In one example, the heat pump may include a thermoelectric element that may use electrical energy to drive cooling. The thermoelectric element may be particularly suitable for use with an electric power source. In some embodiments, the thermoelectric element is a Peltier element. The heat pump may have a heated side and a cooled side and be configured to transfer heat from the cooled side to the heated side in a direction away from the aerosol. The cooling airflow outside of the airflow channel may draw heat away from the heated side of the heat pump.

The heat pump may be used in combination with at least one of the conduit and the heatsink. For example, the heat pump may be coupled to the conduit, the heatsink, or both. In particular, the cooled side of the heat pump may be disposed adjacent to the heatsink to cool ambient air. The cooled air may then pass flow past the heatsink, for example, through the fins to provide efficient cooling.

Any suitable fan may be used. The fan may facilitate movement of the cooling airflow outside of the airflow channel. The fan may be powered by an electric power source. The fan may be used in addition to, or as an alternative to, generating the cooling airflow using the puffing of the user.

The fan may be used in combination with at least one of the conduit, the heatsink, and the heat pump. In one example, the fan may direct the cooling airflow past the heatsink, for example, through the plurality of fins coupled to the conduit. In another example, the fan may be selectively activated. The shisha device may include a temperature sensor and a controller. The temperature sensor may be thermally coupled to the heated side of the heat pump. The fan may be activated in response to the sensed temperature exceeding a temperature threshold. Selective activation of the fan may provide improved temperature. For example, selective activation may help improve cooling only when needed (for example, to save power) or may help prevent overheating of the aerosol-generating element (for example, to prevent burning of the aerosol-forming substrate).

Various types of cooling receptacles may be used. The interior volume of the cooling receptacle may be configured to contain liquid. The liquid may be disposed adjacent to the airflow channel. In particular, the liquid in the cooling receptacle may not be disposed in the path of the aerosol from the aerosol-generating element to the head space outlet. The interior volume of the cooling receptacle may not be in fluid communication with the interior of the vessel. However, in one or more embodiments, the interior volume may be in fluid communication with the interior of the vessel.

The interior volume of the cooling receptacle may be greater than or equal to about 250 ml. Non-limiting examples of liquid used in the cooling receptacle include water and ethylene glycol.

The liquid may be manually disposed by the user into the interior volume. The internal volume may also be filled using other techniques, such as using the liquid pump or through capillary action, using liquid from another source, such as the vessel. Using such techniques may simplify operation of the shisha device. The user may need to fill only the vessel, which will also provide liquid to the cooling receptacle. Capillary action may allow filling without additional power consumption.

In general, the cooling receptacle may the aerosol when the aerosol heats the liquid. The cooling receptacle may then transfer heat away from the liquid in various ways.

One type of cooling receptacle may include one or more ports to allow liquid to flow in or out of the interior volume. Cool liquid may be cycled into the interior volume from an external source. Heated liquid may be cycled out of the interior volume.

Another type of cooling receptacle may include a thermally conductive wall around the interior volume. The thermally conductive wall may be formed of thermally conductive material.

The cooling airflow outside of the airflow channel may draw heat away from the thermally conductive wall.

Yet another type of cooling receptacle may be at least partially porous. The cooling receptacle may include a porous wall that allows liquid to evaporate through the wall. Non-limiting examples of porous material include porous clay and foamed silica.

Still another type of cooling receptacle may be described as a "pot-in-pot" cooling receptacle, which also allows liquid to evaporate. The pot-in-pot cooling receptacle may include an inner wall and an outer wall. The outer wall may define the interior volume for containing liquid and an opening to allow for the escape of vapor. The inner wall may be porous, formed of porous material, and be disposed inside the outer wall. The porous first wall may allow for evaporation of liquid through a surface of the inner wall, which may escape the cooling receptacle as vapor through the opening defined by the outer wall.

The effectiveness of the pot-in-pot cooling receptacle may depend on temperature and humidity of the ambient environment. In some environments with high temperatures and low humidity, the pot-in-pot cooling receptacle may cool the liquid down to 4.5° C.

The cooling receptacle may be used in combination with at least one of the conduit, the heatsink, the heat pump, and the fan. In one example, the liquid may surround a portion of the conduit. In particular, the liquid may completely surround a portion of the conduit. In some embodiments, a combination of at least the cooling receptacle and the heat pump may provide up to about 60° C. of a temperature drop compared to a device without the cooling element. The cooled side of the heat pump may be coupled to, or in contact with, the cooling receptacle. The heatsink may be at least partially disposed in the interior volume of the cooling receptacle in fluid communication with the liquid in the cooling receptacle. The heatsink may be coupled to, or in contact with, the cooled side of the heat pump.

Any type of water block may be used that is configured to cool liquid flowing through the water block. The water block may be used with any suitable liquid, such as water. The water block may be formed of a thermally conductive material having at least one lumen formed therein for liquid to flow through. Heat from the aerosol may heat the liquid and then transferred away from the liquid by the thermally conductive material. The cooling airflow outside of the airflow channel may draw heat away from the water block.

The water block may be used in combination with at least one of the conduit, the heatsink, the heat pump, the fan, and the cooling receptacle. In one example, the cooling receptacle may include one or more ports in fluid communication with the at least one lumen of the water block. Liquid contained in the cooling receptacle may be heated by the aerosol, for example, through the conduit. The heated liquid may be cooled in response to flowing through the water block. The liquid may be connected in a circuit to allow the cooled liquid to return to the cooling receptacle. In some embodiments, the cooled side of the heat pump may be coupled to, or in contact with, the water block to further enhance cooling of the heated liquid. A fan may also be positioned to facilitate airflow past the heated side of the heat pump.

The liquid pump may be any suitable type. In one example, the liquid pump may use electrical energy to move, or circulate, liquid. In another example, the liquid pump may use, or be supported by, the suction of the user while puffing. In this case, characteristics of the liquid pump may be used to adjust the RTD. The liquid pump may not provide cooling by itself. When used with other components, the liquid pump may be considered an active device that facilitates cooling. The pump may be used in combination with at least one of the conduit, the heatsink, the heat pump, the fan, the cooling receptacle, and the water block. In one example, the liquid pump may be used to flow liquid through the water block and the reservoir. In particular, the pump may flow heated liquid from the reservoir to the water block for cooling.

In some embodiments, a combination of at least the liquid pump and the cooling receptacle may provide improved cooling over using the cooling receptacle without the liquid pump. The liquid pump may reduce the amount of time the liquid is in contact with the conduit before being cooled. A higher pumping flow may provide more cooling for the same amount of liquid. As a result, the interior volume may be less than the interior volume of a cooling receptacle without the liquid pump. This may allow the shisha device to have a size that is more comparable to the size of a traditional shisha device.

The shisha device may include a chamber having an air-accelerating inlet. The chamber may be between the aerosol-generating element and the vessel in an airflow path of the shisha device. Aerosol travelling from the aerosol-generating element, or from a zone proximal to the aerosol-generating element to the vessel may pass through the chamber. The chamber may include an inlet that accelerates the aerosol as it enters the chamber. The aerosol exiting the inlet may decelerate, which may improve the aerosol nucleation process and cause an increase in visible aerosol relative to devices that do not include a chamber having an air-accelerating inlet. The amount of visible aerosol may be increased in the main chamber of the unit, in the headspace of the vessel, or in both the main chamber and the vessel. In addition, or alternatively, the total aerosol mass delivered by the shisha device may be increased relative to devices that do not include a chamber having an air-accelerating inlet. For example, the total aerosol mass may increase about 1.5-fold or greater or about 2-fold or greater, such as about 3-fold.

The accelerating element may include, or be formed as, the inlet of the chamber. The description herein of the inlet may be applicable to a nozzle that is at least partially formed by the accelerating element. In some embodiments, the nozzle formed by the cooling element and the accelerating element also serves as the inlet.

The airflow path may include the airflow channel. The airflow path may extend at least, for example, from an air inlet channel to the headspace outlet.

The chamber may have a main chamber in fluid communication with the inlet. The main chamber is sized and shaped to allow deceleration of the aerosol in the main chamber when the aerosol exits the inlet and enters the main chamber. The main chamber may have any suitable size and shape that allows deceleration of the aerosol. Preferably, the main chamber is substantially cylindrical, but may be of any other suitable shape.

The main chamber may have any suitable diameter. For purposes of the present disclosure, unless otherwise specified, "diameter" is a maximum transverse distance from a first end of the object to a second end of the object opposite to the first end. By way of example, the "diameter" may be a diameter of an object having a circular transverse section or may be a width of an object having rectangular transverse section. In some examples, the main chamber has a diameter of at least about 10 mm. For example, the diameter of the main chamber may be from about 10 mm to about 50 mm, such as about 30 mm.

The main chamber may have any suitable length. In some examples, the main chamber has a length of at least about 10 mm. For example, the length of the main chamber may be from about 10 mm to about 100 mm, such as about 40 mm.

Preferably, the inlet protrudes into the main chamber. For example, a first end of the inlet may be formed at an exterior surface of a housing of the chamber, and a second end of the inlet may extend into the main chamber.

Any suitable inlet that accelerates the air carrying the aerosol may be used. A suitable inlet may include guides defining a constricted air flow cross section, which will force the air to accelerate substantially in the axial direction. In some examples, the inlet has a first aperture in proximity to the aerosol-generating element and a second aperture in proximity to the main chamber. Aerosol from the aerosol-generating element flows into the inlet through the first aperture and out of the second aperture into the main chamber. The first aperture has a diameter larger than the second aperture.

The first aperture may have any suitable dimensions. For example, the first aperture of the inlet may have a diameter in a range from about 1 mm to about 10 mm, such as from about 2 mm to about 9 mm, or about 7 mm.

The second aperture of the inlet may have any suitable dimensions. For example, the second aperture may have a diameter in a range from about 0.5 mm to about 4 mm, such as from about 0.5 mm to about 2 mm, or about 1 mm.

The inlet may have any suitable length. For example, the length of the inlet from the first aperture to the second aperture may be from about 1 mm to about 30 mm, such as from about 1 mm to about 20 mm or from about 5 mm to about 30 mm, such as about 20 mm.

Preferably, the inlet has a frusto-conical shape. For example, the inlet may be in the form of a nozzle. An inlet having a frusto-conical shape may allow for efficient acceleration of the aerosol as the aerosol is drawn through the inlet.

The chamber may have any suitable number of air-accelerating inlets. For example, the chamber may have one or more air-accelerating inlet. In some example, the chamber may have 2, 3, 4, or 5 or more air-accelerating inlets.

The chamber may include one or more parts. For example, the main chamber and the one or more inlets may be formed from the same part or from different parts. Preferably, the main chamber is formed from material that allows a user to observe aerosol within the chamber. For example, the main chamber may be formed from optically transparent or opaque material.

The chamber may be positioned in an airflow path between the aerosol-generating element and the vessel configured to contain the liquid. A conduit may connect the chamber to an outlet of the aerosol-generating element. Alternatively, the inlet of the chamber may be the outlet of the aerosol-generating element.

The shisha device may include a main conduit that extends from the chamber into the vessel. Preferably, the main conduit extends into the vessel below a liquid fill level of the vessel. In some examples, the main chamber of the chamber is fluidly connected to the main conduit. In other examples, the main conduit extending into the vessel forms the main chamber of the chamber.

A shisha device of the present invention may have any suitable aerosol-generating element for heating an aerosol-forming substrate to produce an aerosol. Preferably, the aerosol-forming substrate is heated by an electric heating element. The aerosol-generating element contains a receptacle for containing the aerosol-forming substrate to be heated by the heating element. Preferably, the aerosol-forming substrate is in a cartridge when heated by the heating element, and, thus, the aerosol-generating element comprises a cartridge receptacle configured to receive the cartridge. Alternatively, aerosol-forming substrate that is not in a cartridge may be placed in the receptacle.

The aerosol-generating element comprises an air inlet and an aerosol outlet. When a user draws on the shisha device, ambient air may enter the air inlet, pass over or through the aerosol-forming substrate, and exit the aerosol outlet for entry into the inlet of the chamber. In some examples, the aerosol outlet of the aerosol-generating element is, or forms at least a part of, the inlet of the chamber.

Preferably, the heating element of the aerosol-generating element defines at least one surface of the receptacle for holding the aerosol-forming substrate or cartridge. More preferably, the heating element defines at least two surfaces of the receptacle. For example, the heating element may form at least a portion of two or more of a top surface, a side surface, and a bottom surface. Preferably, the heating element defines at least a portion of the top surface and at least a portion of a side surface. More preferably, the heating element forms the entire top surface and an entire side wall surface of the receptacle. The heating element may be disposed on an inner surface or an outer surface of the receptacle.

Any suitable heating element may be employed. For example, the heating element may include one or both of electrically resistive and inductive heating components. Preferably, the heating element has an electrically resistive heating component. For example, the heating element may have one or more electrically resistive wires or other resistive elements. The resistive wires may be in contact with a thermally conductive material to distribute heat produced over a broader area. Examples of suitable thermally conductive materials include aluminium, copper, zinc, nickel, silver, and combinations thereof. For purposes of this disclosure, if electrically resistive wires are in contact with a thermally conductive material, both the electrically resistive wires and the thermally conductive material are part of the heating element that forms at least a portion of the surface of the cartridge receptacle.

In some examples, a heating element comprises an inductive heating element. For example, the heating element may have a susceptor material that forms a surface of the cartridge receptacle.

As used herein, the term "susceptor" refers to a material that is capable to convert electromagnetic energy into heat. When located in an alternating electromagnetic field, typically eddy currents are induced and hysteresis losses may occur in the susceptor causing heating of the susceptor. As the susceptor is located in thermal contact or close thermal proximity with the aerosol-forming substrate, the substrate is heated by the susceptor such that an aerosol is formed. Preferably, the susceptor is arranged at least partially in direct physical contact with the aerosol-forming substrate.

The susceptor may be formed from any material that can be inductively heated to a temperature sufficient to generate an aerosol from the aerosol-forming substrate. Preferably, the susceptor comprises a metal or carbon. A preferred susceptor may include a ferromagnetic material, for example ferritic iron, a ferromagnetic alloy, such as ferromagnetic steel or stainless steel, and ferrite. A suitable susceptor may be, or include, aluminium.

Preferred susceptors are metal susceptors, for example stainless steel. However, susceptor materials may also include or be made of graphite, molybdenum, silicon carbide, aluminium, niobium, Inconel alloys (austenite nickel-chromium-based superalloys), metallized films, ceramics such as for example zirconia, transition metals such as for example Fe, Co, Ni, or metalloids components such as for example B, C, Si, P, Al.

A susceptor preferably include more than 5%, preferably more than 20%, preferably more than 50% or 90% of ferromagnetic or paramagnetic materials. Preferred susceptors may be heated to a temperature in excess of 250 degrees Celsius. Suitable susceptors may have a non-metallic core with a metal layer disposed on the non-metallic core, for example metallic tracks formed on a surface of a ceramic core.

In the system according to the invention, at least one surface of the receptacle or of a cartridge containing aerosol-forming substrate for placement in the receptacle may include susceptor material. Preferably, at least two surfaces of the receptacle have susceptor material. For example, the base and at least one side wall of the receptacle may include susceptor material. Advantageously, at least portions of an outer surface of the cartridge receptacle are made of susceptor material. However, also at least portions of an inner side of the cartridge receptacle may be coated or lined with susceptor material. Preferably, a lining is attached or fixed to the shell such as to form an integral part of the shell.

In addition, or alternatively, the cartridge may have a susceptor material.

The shisha device may also include one or more induction coils configured to induce eddy currents and/or hysteresis losses in a susceptor material, which results in heating of the susceptor material. A susceptor material may also be positioned in the cartridge containing the aerosol-forming substrate. A susceptor element comprising the susceptor material may have any suitable material, such as those described in, for example, PCT Published Patent Applications WO 2014/102092 and WO 2015/177255.

The shisha device may include control electronics operably coupled to the resistive heating element or induction coil. The control electronics are configured to control heating of the heating element.

The control electronics may be provided in any suitable form and may, for example, include a controller or a memory and a controller. Control electronics may include memory that contains instructions that cause one or more components to carry out a function or aspect of the control electronics. Functions attributable to control electronics in this disclosure may be embodied as one or more of software, firmware, and hardware.

In particular, one or more of the components, such as controllers, described herein may include a processor, such as a central processing unit (CPU), computer, logic array, or other device capable of directing data coming into or out of the control electronics. The controller may include one or more computing devices having memory, processing, and communication hardware. The controller may include circuitry used to couple various components of the controller together or with other components operably coupled to the controller. The functions of the controller may be performed by hardware and/or as computer instructions on a non-transient computer readable storage medium.

The processor of the controller may include any one or more of a microprocessor, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

In some embodiments, the control electronics may include a microprocessor, which may be a programmable microprocessor. The electronic circuitry may be configured to regulate a supply of power. The power may be supplied to the heater element or induction coil in the form of pulses of electrical current.

If the heating element is a resistive heating element, the control electronics may be configured to monitor the electrical resistance of the heating element and to control the supply of power to the heating element depending on the electrical resistance of the heating element. In this manner, the control electronics may regulate the temperature of the resistive element.

If the heating components include an induction coil and the heating element comprises a susceptor material, the control electronics may be configured to monitor aspect of the induction coil and to control the supply of power to the induction coil depending on the aspects of the coil such as described in, for example, WO 2015/177255. In this manner, the control electronics may regulate the temperature of the susceptor material.

The shisha device may have a temperature sensor, such as a thermocouple. The temperature sensor may be operably coupled to the control electronics to control the temperature of the heating elements. The temperature sensor may be positioned in any suitable location. For example, the temperature sensor may be configured to insert into the aerosol-forming substrate or a cartridge received within the receptacle to monitor the temperature of the aerosol-forming substrate being heated. In addition, or alternatively, the temperature sensor may be in contact with the heating element. In addition, or alternatively, the temperature sensor may be positioned to detect temperature at an aerosol outlet of the shisha device, such as the aerosol outlet of the aerosol-generating element. In addition, or alternatively, the temperature sensor may be in contact with the cooling element, such as the heated side of the heat pump. The sensor may transmit signals regarding the sensed temperature to the control electronics, which may adjust heating of the heating elements to achieve a suitable temperature at the sensor.

Any suitable thermocouple may be used, such as a K-type thermocouple. The thermocouple may be placed in the cartridge where the temperature is lowest. For example, the thermocouple may be placed in the centre, or middle, of the cartridge. In some shisha devices, the thermocouple may be placed underneath the aerosol-forming substrate (such as molasses), for example, by placing the thermocouple between the substrate receptacle and the heating element (such as charcoal) and then placing substrate on top.

Regardless of whether the shisha device comprises a temperature sensor, the device is preferably configured to heat an aerosol-forming substrate received in the receptacle to an extent sufficient to generate an aerosol without combusting the aerosol-forming substrate.

The control electronics may be operably coupled to a power supply. The shisha device may include any suitable power supply. For example, a power supply of a shisha device may be a battery, or set of batteries (such as a battery pack). In some examples, one or more than one component of the battery, such as the cathode and anode elements, or even the entire battery can be adapted to match geometries of a portion of a shisha device in which they are disposed. In some cases, the battery or battery component may be adapted by rolling or assembling to match geometries. The batteries of power supply unit can be rechargeable, as well as it may be removable and replaceable. Any suitable battery may be used. For example, heavy duty type or standard batteries existing in the market, such as used for industrial heavy duty electrical power-tools. Alternatively, the power supply unit can be any type of electric power supply comprising a super or hyper-capacitor. Alternatively, the device can be powered connected to an external electrical power source, and electrically and electronically designed for such purpose. Regardless of the type of power supply employed, the power supply preferably provides sufficient energy for the normal functioning of the device for approximately 70 minutes of continuous operation of the device, before being recharged or needing to connect to an external electrical power source.

The shisha device comprises an air inlet channel in fluid communication with the receptacle for containing the aerosol-forming substrate. Ambient air flows through the air inlet channel to the receptacle and the substrate disposed in the receptacle to carry aerosol generated from the aerosol-forming substrate to the aerosol outlet when the shisha device is in use. Preferably, at least a portion of the air inlet channel is formed by a heating element to preheat the air prior to entering the receptacle. Preferably, a portion of the heating element that forms a surface of the receptacle forms a portion of the air inlet channel. Preferably the air inlet channel is formed from one or both of the top surface of the receptacle and a side wall of the receptacle that is formed by the heating element. Preferably, the air inlet channel is formed by both the top surface of the receptacle and a side wall of the receptacle that is formed by the heating element.

Preferably, the heating element may include, or be formed of, a part of the cooling element configured to preheat air.

Any suitable portion of the air inlet channel may be formed by the heating element. Preferably, about 50% or more of the length of the air inlet channel is formed by the heating element. In many examples, the heating element will form 95% or less of the length of the air inlet channel.

Air flowing through the air inlet channel may be heated by any suitable amount by the heating element. In some examples, the air will be sufficiently heated to cause an aerosol to form when the heated air flows through the aerosol-forming substrate or a cartridge containing aerosol-forming substrate. In some examples, the air is not sufficiently heated to cause aerosol formation on its own, but facilitates heating of the substrate by the heating element. Preferably, the amount of energy supplied to the heating element to heat the substrate and cause aerosol formation is reduced by 5% or more, such as 10% or more, or 15% or more, when the air is preheated in accordance with the present invention, relative to designs in which air is not preheated. Typically, the energy savings will be less than 75%.

The substrate is preferably heated, through a combination of the preheated air and heating from the heating elements, to a temperature in a range from about 150° C. to about 250° C.; more preferably from about 180° C. to about 230° C. or from about 200° C. to about 230° C.

Preferably, at least a portion of the airflow path is formed between the heating element and a heat shield. Preferably, substantially the entire portion of the air inlet channel that is formed by the air inlet channel is also formed by the heat shield. The heat shield and the heating element may form opposing surfaces of the air inlet channel, such that the air flows between the heat shield and the heating element. Preferably, the heat shield is positioned exterior to an interior formed by the receptacle.

Any suitable heat shield material may be employed. Preferably, the heat shield material has a surface that is thermally reflective. The thermally reflective surface may be backed with an insulating material. In some examples, the thermally reflective material comprises an aluminium metalized film or other suitable thermally reflective material. In some examples, the insulating material comprises a ceramic material. In some examples, the heat shield comprises an aluminium metalized film and a ceramic material backing.

The air inlet channel may comprises one or more apertures through the receptacle such that ambient air from outside the shisha device may flow through the air inlet channel and into the receptacle through the apertures. If the air inlet channel comprises more than one aperture, the air inlet channel may include a manifold to direct air flowing through the air inlet channel to each aperture. Preferably, the shisha device comprises two or more air inlet channels.

The receptacle may include any suitable number of apertures in communication with one or more air inlet channels. For example, the receptacle may include 1 to 1000 apertures, such as 10 to 500 apertures. The apertures may be of uniform size or non-uniform size. The apertures may be uniformly distributed or non-uniformly distributed. The apertures may be formed in the cartridge receptacle at any suitable location. For example, the apertures may be formed in one or both of a top or a sidewall of the receptacle. Preferably, the apertures are formed in the top of the receptacle.

The receptacle is preferably shaped and sized to allow contact between one or more wall or ceiling of the receptacle and the aerosol-forming substrate or a cartridge containing the aerosol-forming substrate when the substrate or cartridge is received by the receptacle to facilitate conductive heating of the aerosol-forming substrate by the heating element forming a surface of the receptacle. In some examples, an air gap may be formed between at least a portion of a cartridge containing the aerosol-forming substrate and a surface of the receptacle, where the air gaps serve as a portion of the air inlet channel.

Preferably, the interior of the receptacle and the exterior of the cartridge containing the aerosol-forming substrate are of similar size and dimensions. Preferably, the interior of the receptacle and the exterior of the cartridge has a height to a base width (or diameter) ratio of greater than about 1.5 to 1. Such ratios may allow for more efficient depletion of the aerosol-forming substrate within the cartridge during use by allowing heat from the heating elements to penetrate to the middle of the cartridge. For example, the receptacle and cartridge may have a base diameter (or width) about 1.5 to about 5 times the height, or about 1.5 to about 4 times the height, or about 1.5 to about 3 times the height. Similarly, the receptacle and cartridge may have a height about 1.5 to about 5 times the base diameter (or width), or about 1.5 to about 4 times the base diameter (or width), or about 1.5 to about 3 times the base diameter (or width). Preferably, the receptacle and cartridge have a height to base diameter ratio or base diameter to height ratio of from about 1.5 to 1 to about 2.5 to 1.

In some examples, the interior of the receptacle and the exterior of the cartridge has a height in a range from about 15 mm to about 25 mm and a base diameter in a range from about 40 mm to about 60 mm.

The receptacle may be formed from one or more parts. Preferably, the receptacle is formed by two or more parts. Preferably, at least one part of the receptacle is movable relative to another part to allow access to the interior of the receptacle for inserting the cartridge into the receptacle. For example, one part may be removably attachable to another part to allow insertion of the aerosol-forming substrate or the cartridge containing the aerosol-forming substrate when the parts are separated. The parts may be attachable in any suitable manner, such as through threaded engagement, interference fit, snap fit, or the like. In some examples, the parts are attached to one another via a hinge. When the parts are attached via a hinge, the parts may also include a locking mechanism to secure the parts relative to one another when the receptacle is in a closed position. In some examples, the receptacle comprises a drawer that may be slid open to allow the aerosol-forming substrate or cartridge to be placed into the drawer and may be slid closed to allow the shisha device to be used.

Any suitable aerosol-forming cartridge may be used with a shisha device as described herein. Preferably, the cartridge comprises a thermally conductive housing. For example, the housing may be formed from aluminium, copper, zinc, nickel, silver, and combinations thereof. Preferably, the housing is formed from aluminium. In some examples, the cartridge is formed from one or more material less thermally conductive than aluminium. For example, the housing may be formed from any suitable thermally stable polymeric material. If the material is sufficiently thin sufficient heat may be transferred through the housing despite the housing being formed from material that is not particularly thermally conductive.

The cartridge may include one or more apertures formed in the top and bottom of the housing to allow air flow through the cartridge when in use. If the top of the receptacle comprises one or more apertures, at least some of the apertures in the top of the cartridge may aligned with the apertures in the top of the receptacle. The cartridge may include an alignment feature configured to mate with a complementary alignment feature of the receptacle to align the apertures of the cartridge with the apertures of the receptacle when the cartridge is inserted into the receptacle. The apertures in the housing of the cartridge may be covered during storage to prevent aerosol-forming substrate stored in the cartridge from spilling out of the cartridge. In addition, or alternatively, the apertures in the housing may have dimensions sufficiently small to prevent or inhibit the aerosol-forming substrate from exiting the cartridge. If the apertures are covered, a consumer may remove the cover prior to inserting the cartridge into the receptacle. In some examples, the receptacle is configured to puncture the cartridge to form apertures in the cartridge. Preferably, the receptacle is configured to puncture the top of the cartridge.

The cartridge may be of any suitable shape. Preferably, the cartridge has a frusto-conical or cylindrical shape.

Any suitable aerosol-forming substrate may be placed in a cartridge for use with shisha devices of the invention or may be placed in the receptacle of the aerosol-generating unit. The aerosol-forming substrate is preferably a substrate capable of releasing volatile compounds that may form an aerosol. The volatile compounds may be released by heating the aerosol-forming substrate. The aerosol-forming substrate may be solid or liquid or include both solid and liquid components. Preferably, the aerosol-forming substrate is solid.

The aerosol-forming substrate may include nicotine. The nicotine containing aerosol-forming substrate may include a nicotine salt matrix. The aerosol-forming substrate may include plant-based material. The aerosol-forming substrate may include tobacco, and preferably the tobacco containing material contains volatile tobacco flavour compounds, which are released from the aerosol-forming substrate upon heating.

The aerosol-forming substrate may include homogenized tobacco material. Homogenized tobacco material may be formed by agglomerating particulate tobacco. Where present, the homogenized tobacco material may have an aerosol-former content of equal to or greater than 5% on a dry weight basis, and preferably between greater than 30% by weight on a dry weight basis. The aerosol-former content may be less than about 95% on a dry weight basis.

The aerosol-forming substrate may alternatively or additionally include a non-tobacco-containing material. The aerosol-forming substrate may include homogenized plant-based material.

The aerosol-forming substrate may include, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco.

The aerosol-forming substrate may include at least one aerosol-former. The aerosol-former may be any suitable known compound or mixture of compounds that, in use, facilitates formation of a dense and stable aerosol and that is substantially resistant to thermal degradation at the operating temperature of the aerosol-generating element. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine. The aerosol-forming substrate may include other additives and ingredients, such as flavourants. The aerosol-forming substrate preferably comprises nicotine and at least one aerosol-former. In a particularly preferred embodiment, the aerosol-former is glycerine.

The solid aerosol-forming substrate may be provided on or embedded in a thermally stable carrier. The carrier may include a thin layer on which the solid substrate deposited on a first major surface, on second major outer surface, or on both the first and second major surfaces. The carrier may be formed of, for example, a paper, or paper like material, a non-woven carbon fiber mat, a low mass open mesh metallic screen, or a perforated metallic foil or any other thermally stable polymer matrix. Alternatively, the carrier may take the form of powder, granules, pellets, shreds, spaghettis, strips or sheets. The carrier may be a non-woven fabric or fiber bundle into which tobacco components have been incorporated. The non-woven fabric or fiber bundle may include, for example, carbon fibers, natural cellulose fibers, or cellulose derivative fibers.

In some examples, the aerosol-forming substrate is in the form of a suspension. For example, the aerosol-forming substrate may be in the form of a thick, molasses-like, suspension.

Air that enters the cartridge flows across the aerosol-forming substrate, entrains aerosol, and exits the cartridge and receptacle via an aerosol outlet. From the aerosol outlet, the air carrying the aerosol enters a vessel.

The shisha device may include any suitable vessel defining an interior volume configured to contain a liquid and defining an outlet in head-space above a liquid fill level. The vessel may include an optically transparent or opaque housing to allow a consumer to observe contents contained in the vessel. The vessel may include a liquid fill demarcation, such as a liquid fill line. The vessel housing may be formed of any suitable material. For example, the vessel housing may include glass or suitable rigid plastic material. Preferably, the vessel is removable from a portion of the shisha device having the aerosol-generation element to allow a consumer to fill or clean the vessel.

The vessel may be filled to a liquid fill level by a consumer. The liquid preferably comprises water, which may optionally be infused with one or more colorants, flavourants, or colorant and flavourants. For example, the water may be infused with one or both of botanical or herbal infusions.

Aerosol entrained in air exiting the chamber may travel through the main conduit positioned in the vessel. The main conduit may have an opening below the liquid fill level of the vessel, such that aerosol flowing through the vessel flows through the opening of the main conduit, then through the liquid, into headspace of the vessel and exits the headspace outlet for delivery to a consumer.

The headspace outlet may be coupled to a hose comprising a mouthpiece for delivering the aerosol to a consumer. The mouthpiece may include a switch activatable by a user or a puff sensor operably coupled to the control electronics of the shisha device. Preferably, the switch or puff sensor is wirelessly coupled to the control electronics. Activation of a switch or puff sensor may cause the control electronics to activate the heating element, rather than constantly supplying energy to the heating element. Accordingly, the use of a switch or puff sensor may serve to save energy relative to devices not employing such elements to provide on-demand heating rather than constant heating.

For purposes of example, one method for using a shisha device as described herein is provided below in chronological order. The vessel may be detached from other components of the shisha device and filled with water. One or more of natural fruit juices, botanicals, and herbal infusions may be added to the water for flavouring. The amount of liquid added should cover a portion of the main conduit but should not exceed a fill level mark that may optionally exist on the vessel. The vessel is then reassembled to the shisha device. A portion of the aerosol-generating element may be removed or opened to allow the aerosol-forming substrate or the cartridge to be inserted into the receptacle. The aerosol-generating element is then reassembled or closed. The device may then be turned on. A user may puff from a mouth piece until a desired volume of aerosol is produced to fill the chamber having the air-accelerating inlet. The user may puff on the mouth piece as desired. The user may continue using the device until no more aerosol is visible in the chamber. Preferably, the device will automatically shut off when the cartridge or substrate is depleted of usable aerosol-forming substrate. Alternatively, or in addition, the consumer may refill the device with fresh aerosol-forming substrate or a fresh cartridge after, for example, receiving the cue from the device that the consumables are depleted or nearly depleted. If refilled with fresh substrate or a fresh cartridge, the device may continue to be used. Preferably, the shisha device may be turned off at any time by a consumer by, for example, switching off the device.

In some examples, a user may activate one or more heating elements by using an activation element on, for example, the mouthpiece. The activation element may be, for example, in wireless communication with the control electronics and may signal control electronics to activate the heating element from standby mode to full heating. Preferably, such manual activation is only enabled while the user puffs on the mouthpiece to prevent overheating or unnecessary heating of aerosol-forming substrate in the cartridge.

In some examples, the mouthpiece comprises a puff sensor in wireless communication with the control electronics and puffing on the mouthpiece by a consumer causes activation of the heating elements from a standby mode to full heating.

A shisha device of the invention may have any suitable air management. In one example, puffing action from the user will create a suction effect causing a low pressure inside the device which will cause external air to flow through air inlet of the device, into the air inlet channel, and into the receptacle of the aerosol-generating element. The air may then flow through aerosol-forming substrate or a cartridge containing the substrate in the receptacle to carry aerosol through the aerosol outlet of the receptacle. The aerosol then may flow into a first aperture of the air-accelerating inlet of the chamber (unless the outlet of the aerosol-generating element also serves as the air-accelerating inlet of the chamber). As the air flows through the inlet of the chamber the air is accelerated. The accelerated air exits the inlet through a second aperture to enter the main chamber of the chamber, where the air is decelerated. Deceleration in the main chamber may improve nucleation leading to enhanced visible aerosol in the chamber. The aerosolized air then may exit the chamber and flow through the main conduit (unless the main conduit is the main chamber of the chamber) to the liquid inside the vessel. The aerosol will then bubble out of the liquid and into head space in the vessel above the level of the liquid, out the headspace outlet, and through the hose and mouthpiece for delivery to the consumer. The flow of external air and the flow of the aerosol inside the shisha device may be driven by the action of puffing from the user.

Preferably, assembly of all main parts of a shisha device of the invention assures hermetic functioning of the device. Hermetic function should assure that proper air flow management occurs. Hermetic functioning may be achieved in any suitable manner. For example, seals such as sealing rings and washers maybe used to ensure hermetic sealing.

Sealing rings and sealing washers or other sealing elements may be made of any suitable material or materials. For example, the seals may include one or more of graphene compounds and silicon compounds. Preferably, the materials are approved for use in humans by the U.S. Food and Drug Administration.

Main parts, such as the chamber, the main conduit from the chamber, a cover housing of the receptacle, and the vessel may be made of any suitable material or materials. For example, these parts may independently be made of glass, glass-based compounds, polysulfone (PSU), polyethersulfone (PES), or polyphenylsulfone (PPSU). Preferably, the parts are formed of materials suitable for use in standard dish washing machines.

In some examples, a mouthpiece of the invention incorporates a quick coupling male/female feature to connect to a hose unit.

Overall, the electronic shisha device may operate as follows. A cartridge filled with an aerosol-forming substrate may be electrically heated. An inner surface of the heating element in contact with the cartridge may be used to heat the aerosol-generating substance. The heating element may be configured such that the temperature provided is sufficient to generate an aerosol without combusting, or burning, the aerosol-forming substrate. A user may draw air from the electric shisha, air may enter via an air inlet channel, pass the cooling element, go along a cartridge, then toward a bottom of the cartridge, then to a bottom of the receptacle. The generated aerosol may be accelerated while passing through an accelerating element. Before or during acceleration, the generated aerosol may be cooled by the cooling element to increase condensation in the aerosol. The aerosol may experience a pressure change upon entering a chamber and expand inside the chamber, which may decelerate the aerosol, before passing through a main conduit, or stem pipe, that is partly immersed in water in a lower volume of a vessel. The generated aerosol passes through the water and expands in an upper volume of the vessel before being extracted by a hose.

While the disclosure is not so limited, an appreciation of various aspects of the disclosure will be gained through a discussion of the illustrative embodiments, drawings, and specific examples provided below, which provide shisha devices with enhanced aerosol characteristics using a cooling element in the airflow path of the shisha device. Various modifications, as well as additional embodiments of the disclosure, will become apparent herein to one skilled in the art.

When referring to the drawings, it will be understood that other aspects not depicted in the drawings fall within the scope and spirit of this disclosure. Like numbers used in the figures refer to like components, steps and the like. However, it will be understood that the use of a number to refer to a component in each figure is not intended to limit the component in another figure labelled with the same number. In addition, the use of different numbers to refer to components in different figures is not intended to indicate that the different numbered components cannot be the same or similar to other numbered components. The figures are presented for purposes of illustration and not limitation. Schematic drawings presented in the figures are not necessarily to scale.

In one illustrative embodiment, the shisha device comprises a cooling element formed of a thermally conductive material (aluminium) in addition to one or more other components that form the airflow path between at least one air inlet channel and the headspace outlet. In particular, at least a conduit of the cooling element is formed of the thermally conductive material. The cooling element may include a heatsink (plurality of fins) coupled to the conduit. The heatsink may surround the conduit. The cooling element may also include a heat pump (Peltier element) may be coupled to the heatsink and may be operably coupled to an electrical power source. The shisha device may provide proper cooling airflow to one or more of the components of the cooling element with a ventilation design. The cooling element may include a fan to facilitate the cooling airflow. The air from the cooling airflow may be heated by the cooling element. This preheated air may be directed by the ventilation design of the shisha device toward the aerosol-generating element to facilitate the generating of aerosol.

In one or more embodiments, the overall size of the cooling element may be small enough to fit within a shisha device. In some embodiments, the cooling element may have a height of about 100 mm, which may include an accelerating element. The heat pumps may be disposed along the side of the conduit. The heated or cooled surface of the heat pump may extend in the same direction as the direction of the airflow channel. Each surface may have a surface area of about 30 mm by about 30 mm.

In another illustrative embodiment, the shisha device comprises a cooling element formed of a cooling receptacle. In particular, the cooling receptacle may surround a conduit of the cooling element. The conduit may be formed of thermally conductive material. The cooling receptacle may be formed of a porous material, which may utilize a pot-in-pot design. The shisha device may provide proper cooling airflow to the cooling receptacle, particularly the exterior of the cooling receptacle, with a ventilation design. The cooling element may include a fan to facilitate the cooling airflow. The air from the cooling airflow may be heated by the cooling element. This preheated air may be directed by the ventilation design of the shisha device toward the aerosol-generating element to facilitate the generating of aerosol.

In yet another illustrative embodiment, the shisha device comprises a cooling element formed of a cooling receptacle, a heatsink, and a heat pump. In particular, the cooling receptacle may surround a conduit of the cooling element. The conduit may be formed of a thermally conductive material. The heatsink is at least partially in the interior volume of the cooling receptacle. The heatsink may be coupled to the cooling receptacle. Preferably, the heatsink is in contact with liquid inside the receptacle. The heat pump is coupled to, or in contact with, the receptacle or the heatsink. In particular, the cooled side of the heat pump may be in contact with the receptacle or heatsink. The shisha device may provide proper cooling airflow to the cooling receptacle, particularly the heated side of the heat pump, with a ventilation design. The cooling element may include a fan to facilitate the cooling airflow. The air from the cooling airflow may be heated by the cooling element. This preheated air may be directed by the ventilation design of the shisha device toward the aerosol-generating element to facilitate the generating of aerosol.

In still another illustrative embodiment, the shisha device comprises a cooling element formed of a cooling receptacle, a water block, a liquid pump, and a heat pump. In particular, the cooling receptacle may surround a conduit of the cooling element. The conduit may be formed of a thermally conductive material. The water block may be in fluid communication with liquid inside the cooling receptacle. The liquid pump may be in fluid communication with the liquid of both the water block and the cooling receptacle to circulate water from the cooling receptacle to the water block to be cooled and back to the cooling receptacle to cool the conduit. The heat pump may be coupled to, or in contact with, the water block. In particular, the cooled side of the heat pump may be in contact with the water block. The shisha device may provide proper cooling airflow to the cooling receptacle, particularly the heated side of the heat pump, with a ventilation design. The cooling element may include a fan to facilitate the cooling airflow. The air from the cooling airflow may be heated by the cooling element. This preheated air may be directed by the ventilation design of the shisha device toward the aerosol-generating element to facilitate the generating of aerosol.

Figure 1:
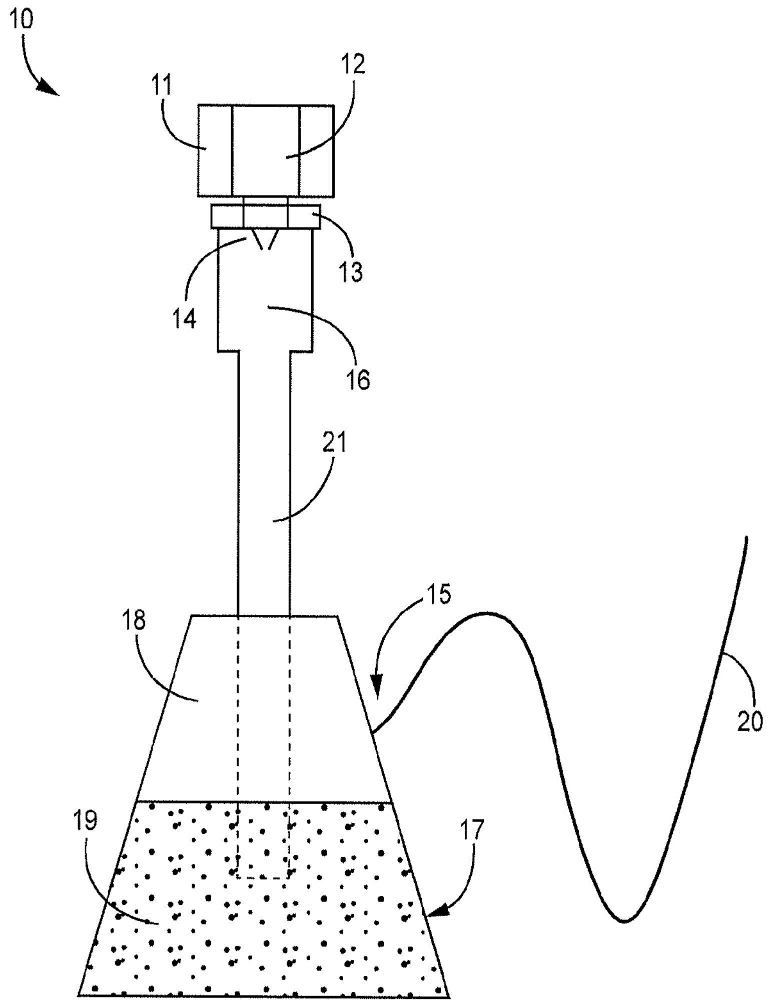
FIG. 1 is a schematic illustration of a shisha device according to an embodiment of the invention.

FIG. 1 shows an embodiment of a shisha device 10 according to an embodiment of the invention. The shisha device comprises an aerosol-generating element 11 configured to receive an aerosol-forming substrate 12. The aerosol-generating element 11 may heat the aerosol-forming substrate 12, for example by means of an electrical heater (not shown), to generate an aerosol. In use, the generated aerosol flows through a cooling element 13 and an accelerating element 14. The cooling element 13 is coupled to the accelerating element 14. Cooled and accelerated aerosol is then ejected into chamber 16, which enables the aerosol to decelerate.

The chamber 16 is in fluid communication with a vessel 17. Indeed, the aerosol-generating element 11 is in fluid communication with the chamber 16 and a vessel 17, by means of a main conduit 21, as illustrated in the example shown in FIG. 1. Therefore, an airflow channel is defined between the aerosol-generating element 11 and an interior of the vessel 17. The interior of the vessel 17 comprises an upper volume 18 for head space and a lower volume 19 for liquid. A hose 20 is in fluid communication with the upper volume 18 through a head space outlet 15 formed in a side of the vessel 17 above a liquid line.

Generated aerosol may flow through the aerosol-generating element 11, through the air flow channel via the cooling element 13, the accelerating element 14, the chamber 16 and the main conduit 21 into the lower volume 19. The aerosol may pass through liquid in the lower volume 19 and rise into the upper volume 18. Puffing by a user on a mouthpiece of the hose 20 may draw the aerosol in the upper volume 18 through the head space outlet 15, into the hose 20 for inhalation. The cooling element 13 is arranged to cool an aerosol generated by the aerosol-generating element 11 as the aerosol flows through the airflow channel. The cooling element 13 is arranged to cool the aerosol as the aerosol flows through the cooling element 13 or through a portion of a main conduit 21 connected to or surrounded by the cooling element 13. The cooling element 13 may be coupled about the main conduit 21. The cooling element 13 may be integrally formed with the main conduit 21.

Figure 2:
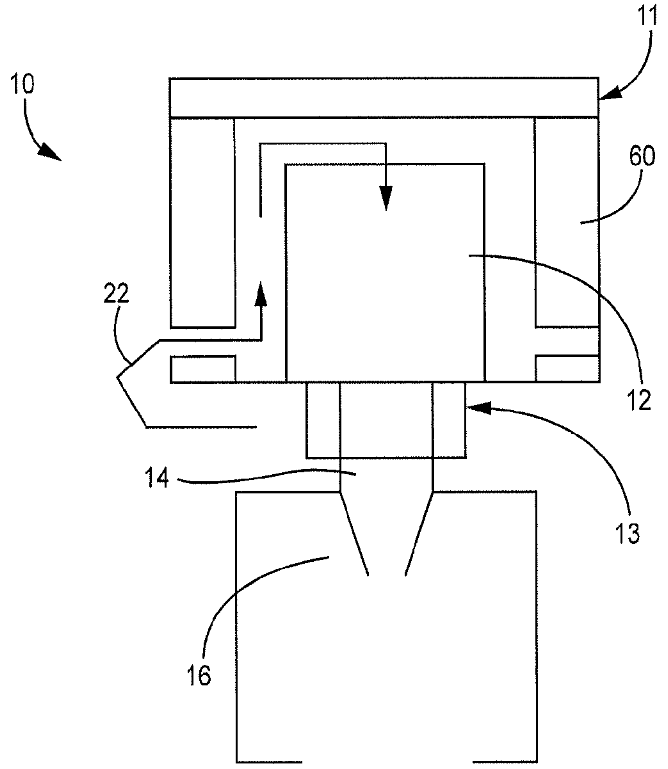
FIG. 2 is a schematic illustration of a portion of the shisha device of FIG. 1 for generating aerosol.

FIG. 2 shows a portion of the shisha device 10. The aerosol-generating element 11 comprises a heating element 60, which may comprise an electrical heating element (not shown), for heating the aerosol-forming substrate 12. The heating element 60 may also function to preheat air 22 before the air 22 flows through the aerosol-forming substrate 60. In some embodiments, for example, the embodiment illustrated in FIG. 2, the air 22 is preheated by passing the cooling element 13 before entering the aerosol-generating element 11 by the design of the shisha device 10. The air 22 may be a cooling airflow that has also already been used to cool the cooling element 13. This may promote power efficiency. The preheated air 22 flows into the aerosol-forming substrate 12 to facilitate generation of aerosol. The generated aerosol then flows through the cooling element 13, the accelerating element 14, and the chamber 16.

Figure 3:
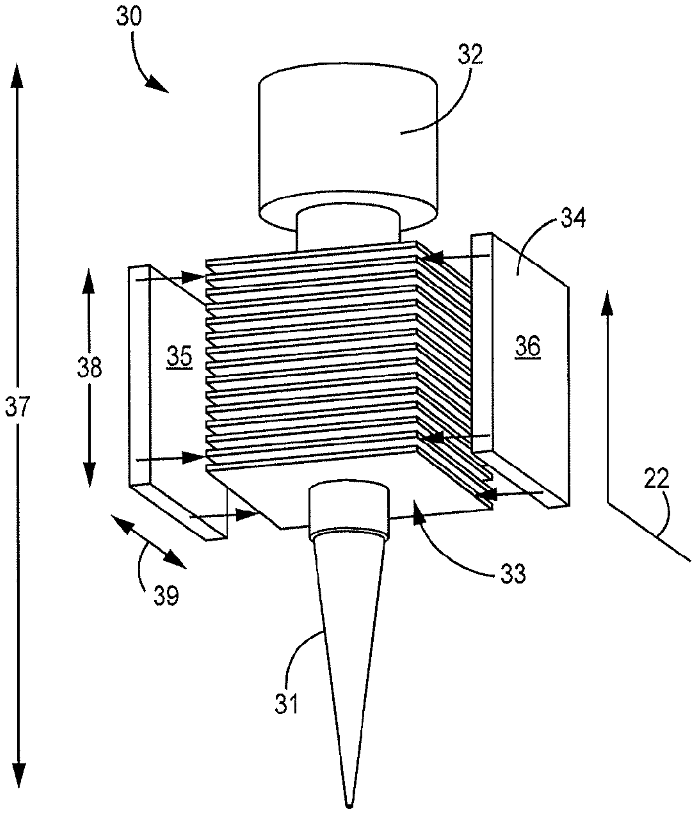
FIG. 3 is a perspective view of a cooling element for a shisha device, according to an embodiment of the invention.

FIG. 3 shows a cooling element 30 according to an embodiment of the invention. The cooling element 30 is coupled to an accelerating element 31. The accelerating element 31 comprises a nozzle. The cooling element 30 comprises a conduit 32 comprising a thermally conductive material, preferably having a relatively high thermal diffusivity, such as aluminium. A heatsink 33, such as fringed heatsink comprising a plurality of fins, is coupled to the conduit 32 to draw heat away from the conduit 32. The fins may be inverted and may be stacked around the air flow channel. Each fin may comprise a surface area of at least 225 $mm^2$. Each fin may comprise a thickness of at least 0.5 mm. The conduit 32 and heatsink 33 therefore provide passive cooling of an aerosol flowing through the cooling element

30 or through a portion of the main conduit 21 to which the cooling element 30 is coupled. The cooling element 30 may additionally comprise one or more active cooling means, such as one or more heat pumps 34. In some embodiments, such as the example shown in FIG. 3, the one or more heat pumps 34 comprise Peltier elements. The one or more heat pumps 34 are coupled to the heatsink 33 (in the direction indicated by the arrows between the heatsink and each heat pump). In particular, a cooled side 35 of each heat pump 34 is coupled to the heatsink 33. A heated side 36 of each heat pump 34 may be cooled by a cooling airflow 22 from an ambient environment. This may be used to preheat ambient air entering the aerosol-generating element 11. Ambient air may be cooled by the cooled side 35 of the heat pump 34 and may subsequently pass through gaps between the fins, thereby providing more efficient heat dissipation.

The cooling element 30 comprises a height 37 suitable for use in a shisha device, such as about 100 mm. Each respective heated and cooled surface 35, 36 of the heat pump 34 comprises a height 38 and width 39 defining a surface area suitable for use in a shisha device. The height 38 and width 39 may each comprise about 30 mm.

A fan (not shown) may be placed proximal to the heated side 36 of the heat pump 34 in order to provide appropriate ventilation of the cooling element 30. The fan may be arranged to be activated when a temperature of the heated side 36 exceeds a pre-selected maximum value.

Figure 4:
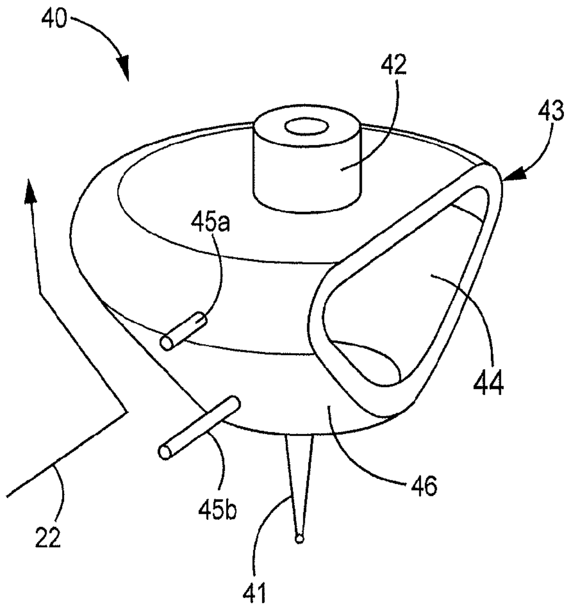
FIG. 4 is a perspective view of cooling element for a shisha device according to another embodiment of the invention.

FIG. 4 shows a cooling element 40 according to another embodiment of the invention. The cooling element 40 is coupled to an accelerating element 41. The cooling element 40 comprises a conduit 42 comprising a thermally conductive material, preferably having a relatively high thermal diffusivity, such as aluminium. The cooling element 40 comprises a cooling receptacle 43. The cooling receptacle 43 is coupled to the conduit 42. In particular, the cooling receptacle 43 surrounds the conduit 42. A cooling liquid 44, such as water or ethylene glycol, is disposed inside the cooling receptacle 43. The cooling liquid 44 may comprise a volume of at least 250 ml.

A wall 46 of the cooling receptacle 43 comprises a porous material, such as a porous clay or foamed silica, to facilitate evaporation of the cooling liquid 44. The cooling liquid 44 is also in fluid communication with an external liquid source or cooling component, such as a water block, through one or more ports 45*a*, 45*b*. The one or more ports, such as an inlet port 45*a* and an outlet port 45*b* may channel the cooling liquid 44 into or out of the receptacle 43 by capillary action. A cooling airflow 22 may be used to facilitate evaporation of the liquid 44 through the porous wall 46 of the receptacle 43 to transfer heat away from the interior of the cooling receptacle 43 and therefore away from an aerosol flowing through the airflow channel past the cooling element 40. The cooling receptacle 43 is provided with a geometry which encourages such cooling airflow 22 to act as a natural fan. In such an embodiment, ambient air may ventilate a heated external surface of the cooling receptacle 43 with each puff of a user.

Optionally, a fan (not shown) may be placed in the proximity of the heated external surface of the cooling receptacle 43 in order to provide appropriate ventilation of the cooling element 40. The fan may be arranged to be activated when a temperature of the heated external surface exceeds a pre-selected maximum value.

Figure 5:
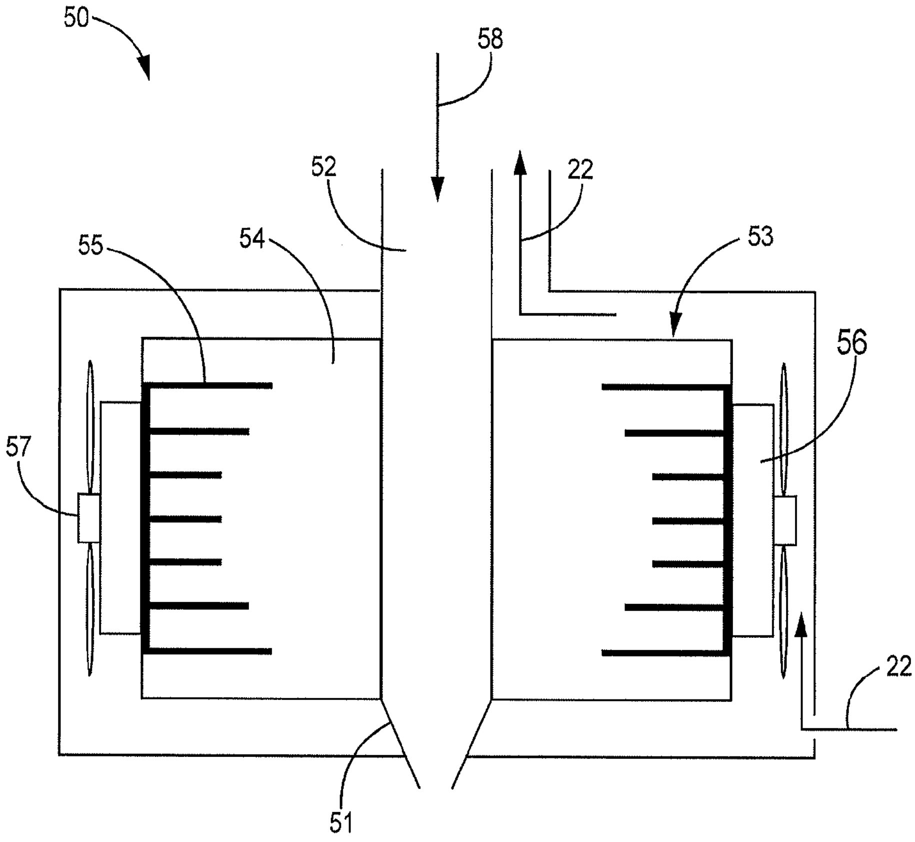
FIG. 5 is a sectional view of a cooling element for a shisha device according to another embodiment of the invention.

FIG. 5 shows another embodiment of a cooling element 50. The cooling element 50 is coupled to an accelerating element 51. The cooling element 50 comprises a conduit 52 comprising a thermally conductive material, preferably having a relatively high thermal diffusivity, such as aluminium. The cooling element 50 comprises a cooling receptacle 53. The cooling receptacle 53 is coupled to the conduit 52. In particular, the cooling receptacle 53 surrounds the conduit 52. A cooling liquid 54, such as water or ethylene glycol, is disposed inside the cooling receptacle 53. The cooling liquid 54 may comprise a volume of at least 250 ml. One or more heatsinks 55 are at least partially disposed in the receptacle 53. The one or more heatsinks 55 is coupled to the receptacle 53. The heatsink 55 draw heat away from the cooling liquid 54. The heatsink 55 may be in contact with the cooling liquid 54. The heatsink 55 may comprise a fringed heatsink comprising a plurality of fins. The fins may be inverted, and each fin may comprise a surface area of at least 225 $mm^2$. Each fin may comprise a thickness of at least 0.5 mm. The conduit 52 and heatsink 55 therefore provide passive cooling of an aerosol flowing through the conduit 52. The cooling element 50 additionally comprises one or more active cooling means, as will now be described. One or more heat pumps 56, such as a thermoelectric cooling element, such as a Peltier element, is coupled to the cooling receptacle 53 or to the heatsinks 55 to draw heat away from the heatsinks 55. In particular, a cooled side of the heat pump 56 is in contact with the receptacle 53 or heatsink 55. A heated side of the heat pump 56 is exposed to a cooling airflow 22 flowing through a cooling airflow channel (not shown) to draw heat away from the heat pump 56. A fan 57 is provided adjacent to the heated side of the heat pump 56 to facilitate the cooling airflow 22. The fan 57 may be coupled to the heat pump 56. In use, aerosol 58 generated by the aerosol-generating element 11 flows through an airflow channel at least partially defined by the cooling element 50 and the accelerating element 51. The cooling element 50 is therefore arranged to cool the aerosol 58 as the aerosol 58 flows through the cooling element 50.

Figure 6:
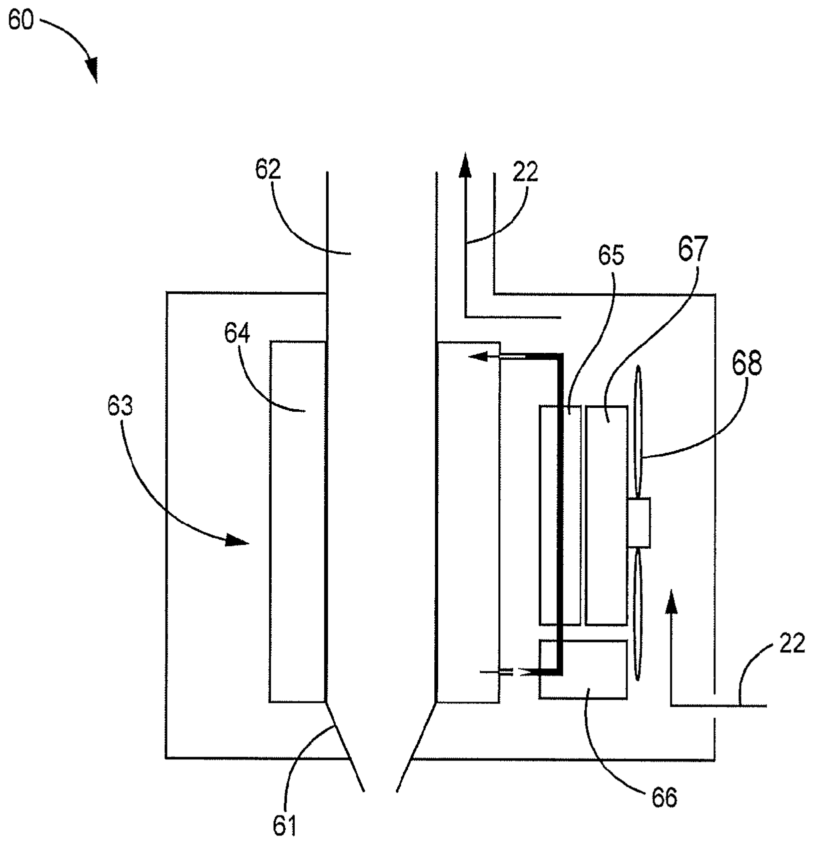
FIG. 6 is a sectional view of a cooling element for a shisha device according to still another embodiment of the invention.

FIG. 6 shows another embodiment of a cooling element 60. The cooling element 60 is coupled to an accelerating element 61. The cooling element 60 comprises a conduit 62 comprising a thermally conductive material, preferably having a relatively high thermal diffusivity, such as aluminium. The cooling element 60 comprises a cooling receptacle 63. The cooling receptacle 63 is coupled to the conduit 62. In particular, the cooling receptacle 63 surrounds the conduit 62. A cooling liquid 64, such as water or ethylene glycol is disposed inside the cooling receptacle 63. The cooling liquid 64 may comprise a volume of at least about 100 ml, or even at least about 250 ml. The cooling liquid 64 is in fluid communication with a liquid volume of a water block 65. The water block 65 functions to draw heat away from the cooling liquid 64. The cooling liquid 64 is circulated by a liquid pump 66 from the cooling receptacle 63 to the water block 65 for cooling the cooling liquid 64. The liquid pump 66 returns the cooling liquid 64 to the cooling receptacle after cooling at the water block 65. A heat pump 67 is coupled to the water block 65. In particular, a cooled side of the heat pump 67 is in contact with the water block 65. A heated side of the heat pump 67 is exposed to a cooling airflow 22 flowing through a cooling airflow channel to draw heat away from the heat pump 67. A fan 68 is located adjacent to the heated side of the heat pump 67 to facilitate the cooling airflow 22. The fan 57 is coupled to the heat pump 67. This may be used to preheat ambient air entering the aerosol-generating element 11.

Figure 7:
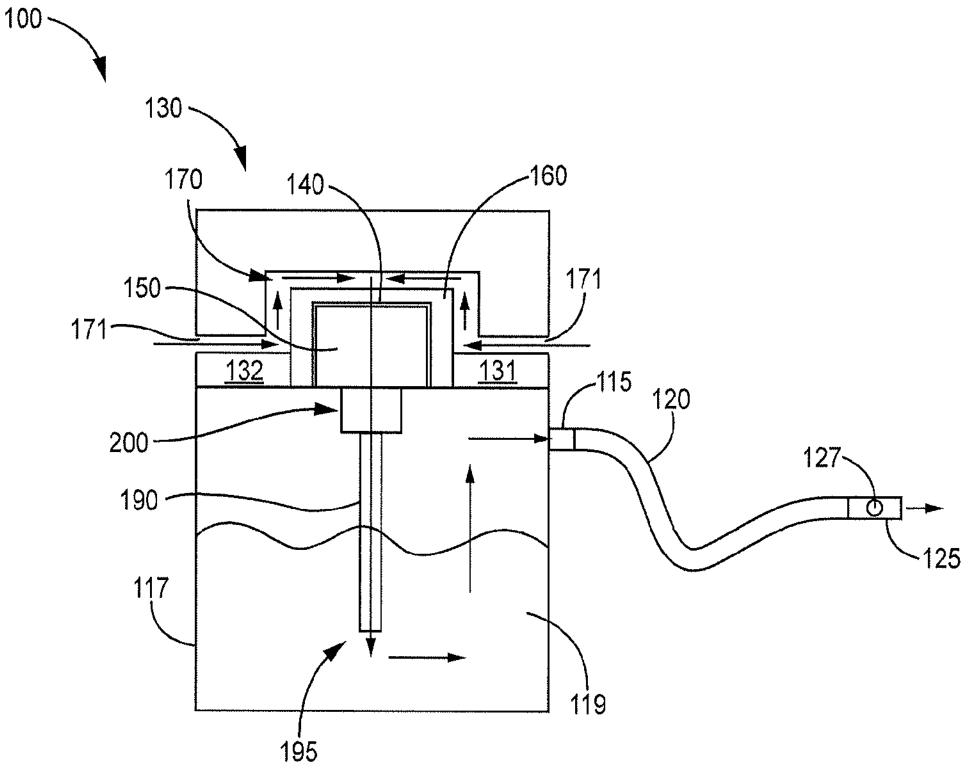
FIG. 7 is a sectional view of part of the shisha device of FIG. 1.

Referring now to FIG. 7, a schematic sectional drawing of an example of a shisha device 100 is shown. The device 100 comprises a vessel 117 defining an interior volume configured to contain liquid 119 and defining a headspace outlet 115 above a fill level for the liquid 119. The liquid 119 preferably comprises water, which may optionally be infused with one or more colorants, one or more flavourants, or one or more colorants and one or more flavourants. For example, the water may be infused with one or both of botanical infusions or herbal infusions.

The device 100 also comprises an aerosol-generating element 130. The aerosol-generating element 130 comprises a receptacle 140 configured to receive a cartridge 150 comprising an aerosol-forming substrate (or receive aerosol-forming substrate that is not in a cartridge). The aerosol-generating element 130 also comprises a heating element 160. The heating element 160 may be an electrical heating element. In some embodiments, such as the embodiment illustrated by FIG. 7, the heating element 160 forms at least one surface of the receptacle 140. In the depicted embodiment, the heating element 160 defines the top and side surfaces of the receptacle 140. The aerosol-generating element 130 comprises an air inlet channel 170 that draws ambient air into the device 100 via an air inlet 171. As illustrated, two air inlets 171 are shown, but any number of air inlets maybe used (one, three, four, or more). A portion of the air inlet channel 170 is defined by the heating element 160 to heat the air before the air enters the receptacle 140. The preheated air then enters the cartridge 150, which is also heated by heating element 160. The air becomes entrained with aerosol generated by the aerosol-forming substrate. The aerosol flows through an outlet of the aerosol-generating element 130 and enters a chamber 200.

Not all components (such as a cooling element) are shown for purposes of brevity and clarity. However, a cooling element is included or disposed between any of the components downstream of the cartridge 150 and upstream of the outlet 195. In some embodiments, the cooling element may at least partially include, or be disposed proximate or adjacent to, the chamber 200.

The aerosol flows from the chamber 200 through a conduit 190 into the vessel 117 via an outlet 195 of the conduit 190 below the level of the liquid 119. An airflow channel is therefore defined between the aerosol-generating element 130 and the vessel 117 and is defined by at least the chamber 200 and the conduit 190. The aerosol bubbles through the liquid 119, rises up into a headspace in the vessel above the liquid 119 and exits the vessel 117 through the headspace outlet 115 of the vessel 117. A hose 120 is coupled to the headspace outlet 115 to carry the aerosol to the mouth of a user. The hose 120 comprises a mouthpiece 125. The mouthpiece 125 may be coupled to the hose 120 or may form an integral part of the hose 120.

An air flow path of the device, in use, as above described, is depicted by thick arrows in FIG. 7.

In some embodiments, such as the embodiment illustrated by FIG. 7, the mouthpiece 125 comprises an activation element 127. The activation element 127 may be a switch, button or the like, or may be a puff sensor or the like. The activation element 127 may be placed at any other suitable location of the device 100. The activation element 27 may be in wireless communication with control electronics 131. The user may therefore interact with the activation element 127 to place the device 100 in condition for use or to cause control electronics to activate the heating element 160; for example, by causing power supply 132 to energize the heating element 140.

The control electronics 131 and a power supply 132 may be located in any suitable position relative to the aerosol generating element 130. In some embodiments, the control electronics 131 and the power supply 132 may be provided in a lower portion of the element 130 as depicted in FIG. 7. However, it will be appreciated that the control electronics 131 and power supply 132 may be provided in any of a variety of other locations in the device 100.

Figure 8:
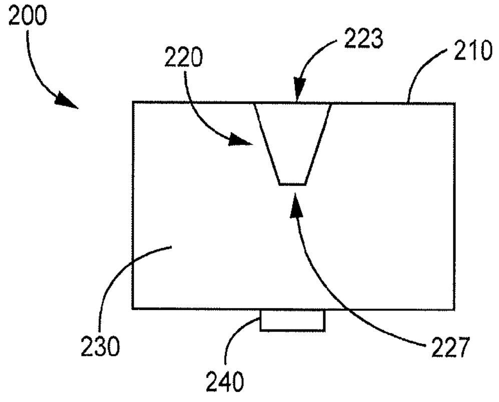
FIG. 8 is a sectional schematic view of t a chamber of the shisha device of FIG. 7.

FIG. 8 shows a schematic sectional view of an example of a chamber 200. The chamber 200 comprises a housing 210 defining a main chamber 230. The chamber 200 comprises an inlet 220 extending or protruding into the main chamber 230. An inlet 220 to the chamber 200 comprises a first aperture 223 and a second aperture 227. Aerosol generated by the aerosol-generating element enters the inlet 220 through the first aperture 223 and enters the main chamber 230 through the second aperture 227. The first aperture 223 has a diameter greater than the second aperture 227 so that air, or indeed the aerosol flowing through the inlet 220 from the first aperture 223 to the second aperture 227 is accelerated. The accelerated air exits the second aperture 227 to enter the main chamber 230. The air or aerosol is decelerated as it exits the second aperture 227 and enters the main chamber 230. The decelerated air or aerosol passes through the main chamber 230 before then exiting the main chamber 230 through an outlet 240. The outlet 240 is in fluid communication with a conduit (such as the conduit 190 depicted in FIG. 1) to convey the aerosol to the vessel 117. Although two apertures 223, 227 are depicted, it will be appreciated that any form of air flow restriction may be provided at the inlet 220.

Not all components (such as a cooling element) are shown for purposes of brevity and clarity. However, a cooling element is included upstream of the chamber 230. In some embodiments, the cooling element may at least partially include, or be disposed proximate or adjacent to, the inlet 220.

Figure 9:
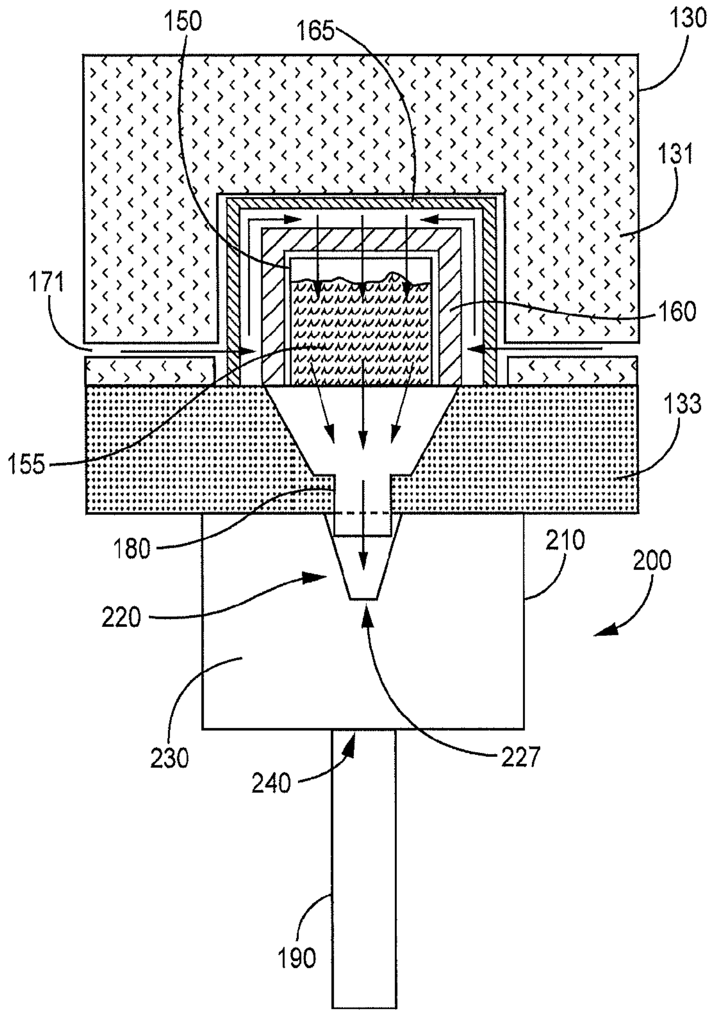
FIG. 9 is a sectional view of the chamber of FIG. 8 coupled to the shisha device of FIG. 7.

FIG. 9 shows a schematic sectional view of an example of a chamber 200 operably coupled to an aerosol-generating element 130 and a conduit 190. In the illustrated embodiment, air enters through air inlets 171 in an upper part 131 of the aerosol-generating element 130, then passes through a heat shield 165, then follows the outside surface of the heating element 160 and arrives to the top of the heating element 160. The heated air then goes through a top surface of a housing of the cartridge 150, through the aerosol-forming substrate 155, and through a void in a bottom part 133, down to the aerosol outlet 180. The aerosolized air then enters the inlet 220 of the chamber 200, as the aerosolized air travels through the inlet 220, it is accelerated. The accelerated air exits the inlet 220 via the second aperture 227 and enters the main chamber 230, where the accelerated air is expanded. The decelerated air exits the chamber 200 via outlet 240 and enters conduit 190 for travel into the vessel.

Not all components (such as a cooling element) are shown for purposes of brevity and clarity. However, a cooling element is included upstream of the chamber 230. In some embodiments, the cooling element may at least partially include, or be disposed proximate or adjacent to, the lower part 133 or the inlet 220.

In the embodiment depicted in FIG. 9, the air travels along the outer surface of the heating element 160 and then through the heating element 160. In other embodiments (not depicted), the air may travel along an inner surface of the heating element 160.

In the example depicted in FIG. 9, the upper part 131 of the aerosol-generating element 130 may be removed from the lower part 133 to allow the cartridge 150 (or aerosol-forming substrate that is not in a cartridge) to be inserted or removed from the receptacle formed by the heating element 160 and the top surface of the bottom part 131. The bodies of the upper part 131 and the lower part 133 may be formed from thermally insulating material.

Examples of the shisha device were made and tested for aerosol production and compared to a shisha device without a cooling element. In order to test the aerosol production using TAM, the following measurement was performed. A cartridge including an aluminium housing coupled to a wound-wire heating element was provided. The wound-wire element included a ceramic cylinder having an internal diameter of 27.99±0.01 mm, a length of 41.5 mm, and a thickness of ceramic of 3 mm. The ceramic was obtained from Corning GmbH, Wiesbaden, Germany, under the trade designation "MACOR." The cartridge was filled with 10 g of commercially available Al-Fakher molasses (aerosol-forming substrate) was heated using the wound-wire heating element (aerosol-generating element) set at a constant temperature of 180° C. (Example 2) or 200° C. (Example 1). The generated aerosol was passed through a nozzle (accelerating element). The generated aerosol was collected using a total of 10 Cambridge pads whose weight was recorded before and after the experience. Only two of the ten Cambridge pads collected the generated aerosol at a given moment. The total duration of the experiment was designed to correspond to 105 puffs. Every 20 puffs, a check valve ensured that the aerosol was diverted to the correct pair of Cambridge pads. In order to simulate the desired puffing experience, four programmable dual syringe pumps (PDSP) manufactured by Mechatronic AG, Darmstadt, Germany, were used simultaneously to create the following puffing regime:

Puff volume: 530 ml

Puff duration: 2600 ms

Duration between puffs: 17 s

In order to measure temperature, the wound-wire heating element was operated at a temperature of 200° C. A thermocouple (temperature sensor) was placed on the nozzle near the cooling element to approximate the temperature inside the cavity of the nozzle. The thermocouple was a K-type thermocouple. Temperatures were measured as a function of time over a span of about 38 minutes. During the first 4 minutes, described as the preheat time, the temperature of the heating element rose, and the puffing was not yet activated. It was observed that, the temperature inside the cavity increased rapidly once the puffing was activated and aerosol passed through the nozzle and decreased once the aerosol was no longer present. Due to the inherent lack of reliability to measure the temperature of an aerosol, the curves of the temperature versus time graphs were corrected to display only the temperature readings obtained when no aerosol was being puffed.

In Example 1, the role of diffusion was tested. Two nozzles were made of different materials, one made of epoxy resin and the other made of aluminium (cooling element having a conduit comprising a thermally conductive material). The epoxy resin was a high temperature epoxy resin obtained from Formlabs, Berlin, Germany. The aluminium has a relatively higher thermal diffusivity than the epoxy resin. The thermal diffusivities are $10^{-7}$ $m^2/S$ for epoxy resin and $9.7*10^{-5}$ $m^2/s$ for aluminium. The most restrictive cross-sectional diameter of each nozzle was about 1.6 mm, which resulted in an RTD of about 46 mmWG for each nozzle. No active cooling was used.

Figure 10:
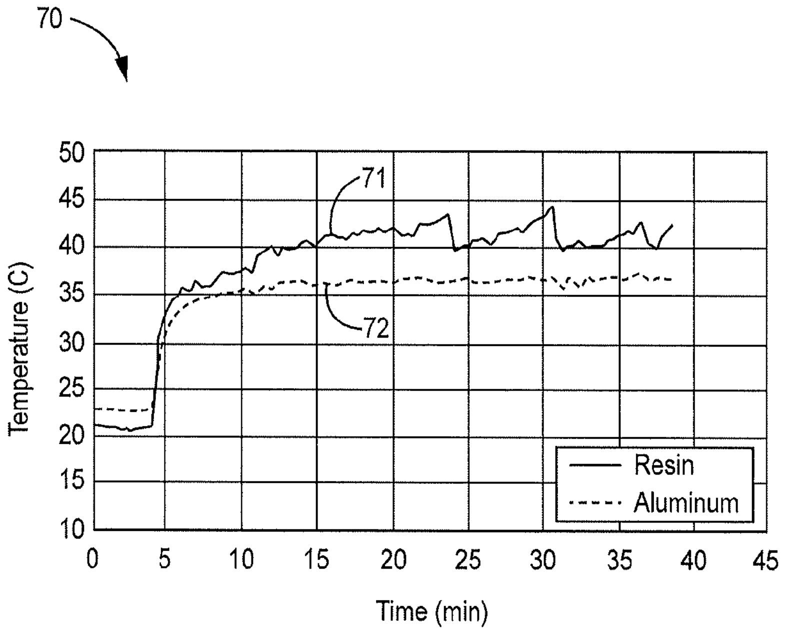
FIG. 10 is a graph showing temperature for a shisha device having a passive cooling element compared to a shisha device without a cooling element.

FIG. 10 shows a graph 70 of temperature as a function of time for a shisha device having a passive cooling element compared to a shisha device without a cooling element. The heater was operated at a temperature of 200° C. For the nozzle made of aluminium, during the preheat time, the temperature 71 inside the cavity was about 23° C. Once the puffing was activated, the temperature 71 inside the cavity was stable at about 36° C. For the nozzle made of epoxy resin, during the preheat time, the temperature 72 inside the cavity was about 20° C. Between puffs, the temperature 72 inside the cavity was stable at about 40° C. The temperature difference between the two nozzles was about 4° C. cooler for the aluminium nozzle compared to the epoxy resin nozzle, particularly after puffing was activated.

Figure 11:
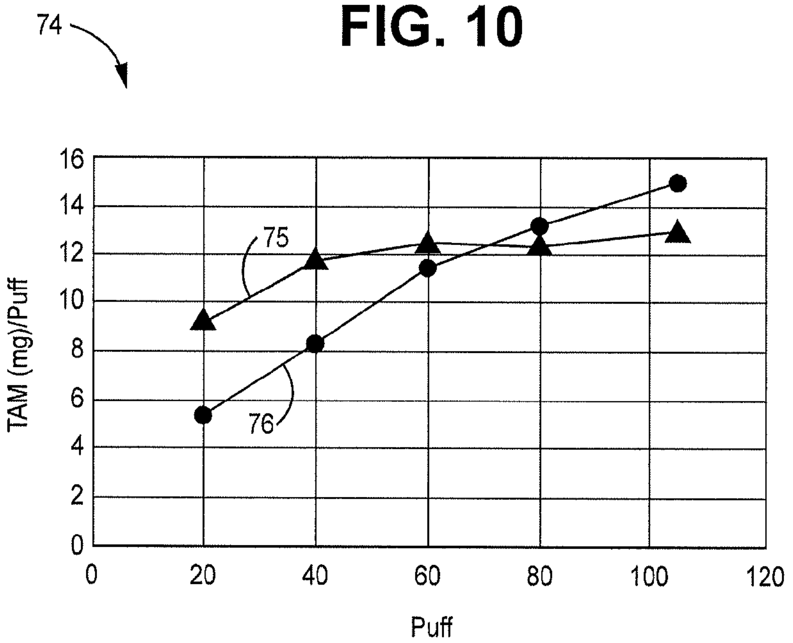
FIG. 11 is a graph showing total aerosol mass for a shisha device having a passive cooling element compared to a shisha device without a cooling element.

FIG. 11 shows a graph 74 of average TAM per puff as a function of sequential puffs for a shisha device having a passive cooling element compared to a shisha device without a cooling element. The heater was operated at a temperature of 200° C. The aluminium nozzle produced a higher average TAM per puff 75 of 1240 mg compared to the average TAM per puff 76 of 1120 mg for the epoxy resin, over the first 40 puffs. The aluminium nozzle also resulted in a substantial improvement of average TAM per puff 75 during the first 60 puffs of the experience. After puff 60, the average TAM per puff 75 of the aluminium nozzle increased less than the average TAM per puff 76 of the epoxy resin nozzle. Presumably, after puff 60, the amount of molasses over the volatilization temperature is believed to be large enough for the effect of the diffusivity of the material to not be determinant any longer.

In Example 2, a nozzle (accelerating element) of epoxy resin was made as described in Example 1. Around the nozzle, a cooling jacket (cooling receptacle) was placed with a diameter of 30 mm and a height of 30 mm filled with dry ice (temperature of about −80° C.). One thermocouple was placed on the nozzle below the cooling jacket.

Figure 12:
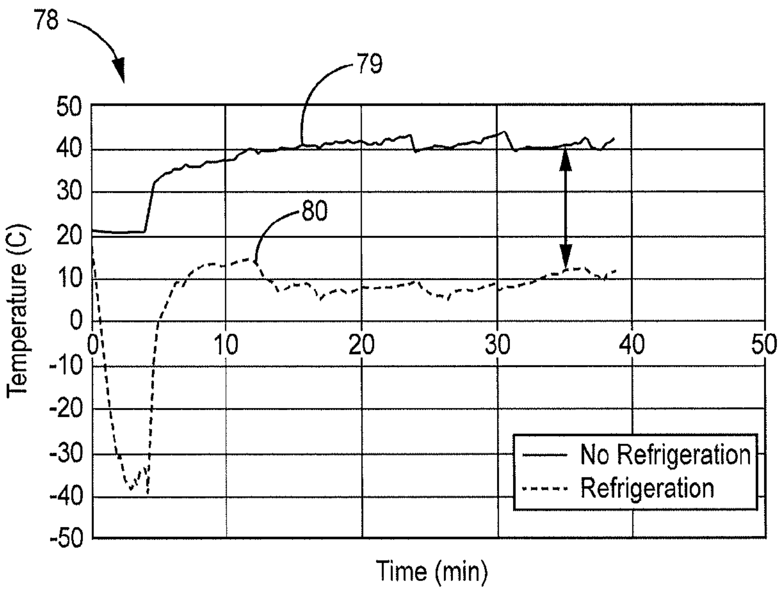
FIG. 12 is a graph showing temperature for a shisha device having a cooling element compared to a shisha device without a cooling element.

FIG. 12 shows a graph 78 of temperature as a function of time for a shisha device having an active cooling element compared to a shisha device without a cooling element. The temperature 79 of air inside the cooled conduit was lower than the temperature 80 of the air inside the conduit that was not cooled.

The wound-wire heating element was operated at a temperature of 200° C. Temperatures were recorded with and without cooling jacket as a function of time. For the nozzle with cooling, during the preheat time, the temperature 79 inside the cavity was about −40° C. Once the puffing is activated, the temperature 79 was stable at about 10° C. For the nozzle without cooling, during the preheat time, the temperature 80 inside the cavity was about 20° C. It was observed that during the 17 seconds available between puffs, the temperature 80 inside the nozzle cavity was stable at about 40° C. The temperature difference between the nozzles was about 30° C. cooler for the nozzle with cooling compared to the nozzle without cooling.

Figure 13:
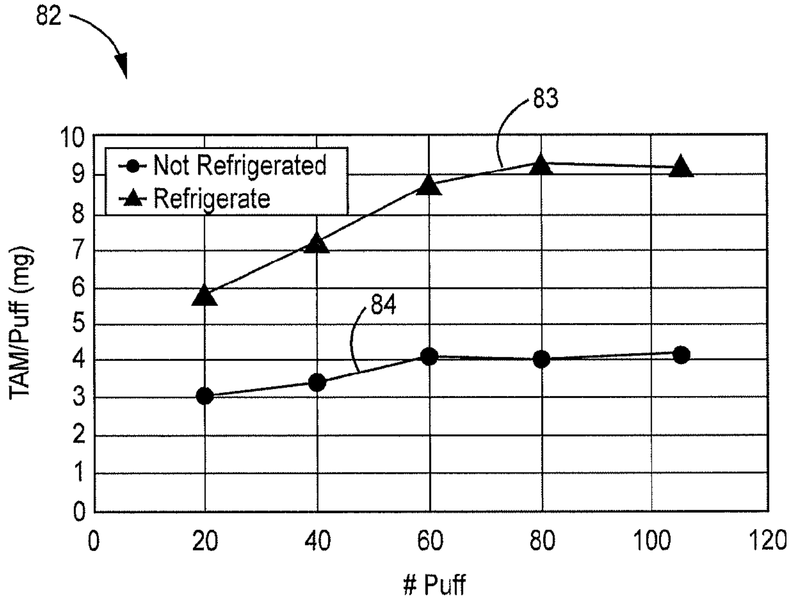
FIG. 13 is a graph showing total aerosol mass for a shisha device having a cooling element compared to a shisha device without a cooling element.

FIG. 13 shows a graph 82 of average TAM per puff as a function of sequential puffs for a shisha device having an active cooling element compared to a shisha device without a cooling element. The heater was operated at a temperature of 180° C. The nozzle with cooling produced an average TAM per puff 83 of 850 mg, over the first 40 puffs. The nozzle without cooling produced an average TAM per puff 84 of 400 mg, over the first 40 puffs. In general, the nozzle with cooling provided the higher average TAM per puff 83 for puffs from 20 to 105 compared to the average TAM per puff 84 for the nozzle without cooling.

The specific embodiments described above are intended to illustrate the invention. However, other embodiments may be made without departing from the scope of the invention as defined in the claims, and it is to be understood that the specific embodiments described above are not intended to be limiting.

As used herein, the singular forms “a,” “an,” and “the” encompass embodiments having plural referents, unless the content clearly dictates otherwise.

As used herein, “or” is generally employed in its sense including “and/or” unless the content clearly dictates otherwise. The term “and/or” means one or all the listed elements or a combination of any two or more of the listed elements.

As used herein, “have,” “having,” “include,” “including,” “comprise,” “comprising” or the like are used in their open-ended sense, and generally mean “including, but not limited to”. It will be understood that “consisting essentially of,” “consisting of,” and the like are subsumed in “comprising,” and the like.

The words “preferred” and “preferably” refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

The invention claimed is:

1. A shisha device comprising:

a vessel defining an interior for housing a volume of liquid, the vessel comprising a head space outlet;

an aerosol-generating element for receiving an aerosol-forming substrate, the aerosol-generating element in fluid communication with the interior of the vessel via an airflow channel, the airflow channel extending into the interior of the vessel from the aerosol-generating element;

a cooling element along the airflow channel between the aerosol-generating element and the vessel, the cooling element configured to cool aerosol in the airflow channel that flows through the cooling element and couplable to a power source to provide active cooling to transfer heat away from the airflow channel; and an accelerating element along the airflow channel between the aerosol-generating element and the vessel, the accelerating element configured to accelerate aerosol in the airflow channel that flows through the accelerating element; and, a chamber along the airflow channel between the vessel and the accelerating element, the chamber configured to receive aerosol after being accelerated;

wherein the cooling element is at least partially or entirely disposed between the chamber and the aerosol-generating element.

2. A shisha device according to claim 1, wherein at least a portion of the cooling element and the accelerating element integrally form a nozzle.

3. A shisha device according to claim 1, wherein the shisha device defines a resistance to draw along the airflow channel of 45 mmWG or less.

4. A shisha device according to claim 1, wherein the cooling element is further configured to provide passive cooling.

5. A shisha device according to claim 4, wherein the cooling element comprises one or both of a thermally conductive material and a heat sink.

6. A shisha device according to claim 1, wherein the cooling element comprises at least one of: a conduit comprising a heat pump, a fan, a cooling receptacle having an interior volume for liquid disposed adjacent to the airflow channel, a water block, and a liquid pump.

7. A shisha device according to claim 1, wherein the cooling element comprises a conduit, wherein the conduit and the accelerating element comprise one or more materials having thermal diffusivities of $10^{-6}$ $m^2/s$ or greater.

8. A shisha device according to claim 1, wherein the cooling element comprises a cooling receptacle, wherein the cooling receptacle is configured to evaporate liquid disposed in the interior volume and transfer the evaporated liquid outside of the vessel.

9. A shisha device according to claim 1, wherein the cooling element comprises:

a cooling receptacle; and at least one of a heatsink and a water block, wherein one or both of the heatsink and the water block are in fluid communication with the interior volume of an cooling receptacle.

10. A shisha device according to claim 1, wherein the cooling element is configured to preheat air that flows into the aerosol-generating element.

11. A shisha device according to claim 1, wherein the chamber comprises a main chamber in fluid communication with the accelerating element, wherein the main chamber is sized and shaped to allow deceleration of the aerosol in the main chamber when the aerosol exits the accelerating element and enters the main chamber.

12. A shisha device according to claim 9, wherein the accelerating element comprises a first aperture proximal to the aerosol-generating element and a second aperture between the first aperture and the main chamber, wherein aerosol flows into the accelerating element through the first aperture and out of the second aperture into the main chamber, wherein the first aperture has a relatively larger diameter than the second aperture.

13. A shisha device according to claim 1, wherein the aerosol-generating element is configured to heat an aerosol-forming substrate to generate an aerosol from the aerosol-forming substrate without combusting the aerosol-forming substrate.

14. A shisha device comprising:

a vessel defining an interior for housing a volume of liquid, the vessel comprising a head space outlet;

an aerosol-generating element for receiving an aerosol-forming substrate, the aerosol-generating element in fluid communication with the interior of the vessel via an airflow channel, the airflow channel extending into the interior of the vessel from the aerosol-generating element;

a cooling element along the airflow channel between the aerosol-generating element and the vessel, the cooling element configured to cool aerosol in the airflow channel that flows through the cooling element and couplable to a power source to provide active cooling to transfer heat away rom the airflow channel;

wherein at least a portion of the cooling element and the accelerating element integrally form a nozzle and;

an accelerating element along the airflow channel between the aerosol-generating element and the vessel, the accelerating element configured to accelerate aerosol in the airflow channel that flows through the accelerating element.

15. A shisha device comprising:

a vessel defining an interior for housing a volume of liquid, the vessel comprising a head space outlet, an aerosol-generating element for receiving an aerosol-forming substrate, the aerosol-generating element in fluid communication with the interior of the vessel via an airflow channel, the airflow channel extending into the interior of the vessel from the aerosol-generating element;

a cooling element along the airflow channel between the aerosol-generating element and the vessel, the cooling element configured to cool aerosol in the airflow channel that flows through the cooling element and couplable to a power source to provide active cooling to transfer heat away from the airflow channel, and an accelerating element along the airflow channel between the aerosol-generating element and the vessel, the accelerating element configured to accelerate aerosol in the airflow channel that flows through the accelerating element;

wherein the cooling element is configured to preheat air that flows into the aerosol-generating element.

* * * * *